United States Patent
Kilian et al.

(10) Patent No.: US 12,225,520 B2
(45) Date of Patent: Feb. 11, 2025

(54) SYSTEM COMBINATION OF AN ASYNCHRONOUS AND A SYNCHRONOUS RADIO SYSTEM

(71) Applicant: Fraunhofer-Gesellschaft zur Förderung der angewandten Forschung e.V., Munich (DE)

(72) Inventors: Gerd Kilian, Erlangen (DE); Josef Bernhard, Erlangen (DE); Dominik Soller, Erlangen (DE); Günter Rohmer, Erlangen (DE); Frank Nachtrab, Erlangen (DE); Jakob Kneißl, Erlangen (DE); Stefan Ereth, Erlangen (DE); Michael Schlicht, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 572 days.

(21) Appl. No.: 17/492,073

(22) Filed: Oct. 1, 2021

(65) Prior Publication Data
US 2022/0022205 A1   Jan. 20, 2022

Related U.S. Application Data

(63) Continuation of application No. PCT/EP2020/059034, filed on Mar. 31, 2020.

(30) Foreign Application Priority Data

Apr. 5, 2019  (DE) .................... 10 2019 204 916.8

(51) Int. Cl.
H04W 72/12   (2023.01)
H04B 1/692   (2011.01)
(Continued)

(52) U.S. Cl.
CPC ........ *H04W 72/1215* (2013.01); *H04B 1/692* (2013.01); *H04W 16/14* (2013.01);
(Continued)

(58) Field of Classification Search
CPC . H04W 72/1215; H04W 16/14; H04W 88/06; H04B 1/692; H04B 1/713; H04B 2001/6908
See application file for complete search history.

(56) References Cited

U.S. PATENT DOCUMENTS 5,761,619 A    6/1998  Danne et al.
6,574,266 B1 * 6/2003  Haartsen ............... H04W 48/10
                                                           455/434
(Continued)

FOREIGN PATENT DOCUMENTS

CN    101964694 A    2/2011
CN    106716888 A    5/2017
(Continued)

OTHER PUBLICATIONS

Russian language office action dated Jan. 31, 2022, issued in application No. RU 2021131336.
(Continued)

*Primary Examiner* — Jael M Ulysse
(74) *Attorney, Agent, or Firm* — McClure, Qualey & Rodack, LLP

(57) ABSTRACT

What is describes is a participant of a communication system, the participant being configured to transmit data using a first radio network and a second radio network in a frequency band, the participant being configured to transmit data in the first radio network according to a first time and/or frequency hopping pattern in a first frequency range of the frequency band, the participant being configured to transmit data in the second radio network according to a second time
(Continued)

and/or frequency hopping pattern in a second frequency range of the frequency band, wherein the first time and/or frequency hopping pattern and the second time and/or frequency hopping pattern are different, wherein the first frequency range and the second frequency range overlap at least partially.

20 Claims, 8 Drawing Sheets

(51) Int. Cl.
  *H04W 16/14*   (2009.01)
  *H04B 1/69*    (2011.01)
  *H04B 1/713*   (2011.01)
  *H04W 88/06*   (2009.01)

(52) U.S. Cl.
  CPC ...... H04B 2001/6908 (2013.01); *H04B 1/713* (2013.01); *H04W 88/06* (2013.01)

(56) References Cited

U.S. PATENT DOCUMENTS

| | | | |
|---|---|---|---|
| 6,894,988 | B1 | 5/2005 | Zehavi |
| 10,523,382 | B2* | 12/2019 | Kimura ............. H04W 72/0446 |
| 10,716,058 | B2* | 7/2020 | Choi ............... H04W 36/00224 |
| 11,070,247 | B2 | 7/2021 | Kilian et al. |
| 2007/0183338 | A1 | 8/2007 | Singh et al. |
| 2008/0187028 | A1 | 8/2008 | Lida |
| 2009/0258607 | A1* | 10/2009 | Beninghaus ......... H04B 1/3805 455/77 |
| 2010/0202327 | A1* | 8/2010 | Mushkin .................. H04L 5/14 370/280 |
| 2011/0075643 | A1 | 3/2011 | Natan et al. |
| 2014/0176341 | A1 | 6/2014 | Bernhard et al. |
| 2015/0054656 | A1 | 2/2015 | Hryciuk |
| 2015/0245327 | A1* | 8/2015 | Damnjanovic ... H04W 72/1215 370/336 |
| 2015/0245411 | A1* | 8/2015 | Damnjanovic ....... H04W 74/08 370/328 |
| 2015/0305041 | A1* | 10/2015 | Kim ................... H04W 72/542 370/329 |
| 2017/0164307 | A1* | 6/2017 | Zuniga .................... H04L 1/005 |
| 2018/0013594 | A1* | 1/2018 | Mukkavilli ............... H04L 5/14 |
| 2018/0176947 | A1 | 6/2018 | Yu et al. |
| 2018/0184391 | A1* | 6/2018 | Ly ...................... H04W 72/1215 |
| 2018/0324828 | A1* | 11/2018 | Mukherjee ............ H04W 16/14 |
| 2019/0021075 | A1* | 1/2019 | Tan ......................... H04B 1/40 |
| 2019/0045345 | A1* | 2/2019 | Lee ........................ H04L 1/1812 |
| 2019/0253102 | A1* | 8/2019 | Kilian ................... H04L 1/0061 |
| 2020/0106576 | A1* | 4/2020 | Kimura ................ H04L 5/0012 |
| 2021/0105041 | A1* | 4/2021 | Obernosterer ......... H04B 1/715 |
| 2021/0194538 | A1 | 6/2021 | Kilian et al. |
| 2022/0132527 | A1* | 4/2022 | Cui ..................... H04W 56/001 |
| 2022/0150950 | A1* | 5/2022 | Islam .................... H04L 1/1896 |

FOREIGN PATENT DOCUMENTS

| | | | | |
|---|---|---|---|---|
| DE | 10 2011 082 098 | B4 | 4/2014 | |
| DE | 102016220882 | A1 * | 4/2018 | ........... H04B 1/7143 |
| DE | 10 2018 210 245 | A1 | 12/2019 | |
| DE | 10 2018 215 193 | A1 | 3/2020 | |
| DE | 10 2019 202 725 | A1 | 9/2020 | |
| EP | 1 274 194 | A1 | 1/2003 | |
| JP | 2018-527811 | A | 9/2018 | |
| RU | 2 158 490 | C2 | 10/2000 | |
| RU | 2 358 385 | C2 | 6/2009 | |
| RU | 2 500 086 | C1 | 11/2013 | |
| WO | 01/24457 | A1 | 4/2001 | |
| WO | 2008/135975 | A2 | 11/2008 | |
| WO | 2016/031343 | A1 | 3/2016 | |
| WO | 2018/077770 | A2 | 5/2018 | |
| WO | 2019/034524 | A1 | 2/2019 | |

OTHER PUBLICATIONS

English language translation of office action dated Jan. 31, 2022, issued in application no. RU 2021131336 (pp. 1-7 of attachments).
Chinese language office action dated 2024-01-17, issued in application No. CN 202080041428.4.
English language translation of office action dated Jan. 17, 2024 (pp. 1-8 of attachment).
NTT Docomo, Inc.; "RP-171137 Status Report of WI on New Radio Access Technology;" 3GPP tsg_ran\tsg_ran, TSGR_76; May 2017; pp. 1-218.
International Search Report and Written Opinion issued in application No. PCT/EP2020/059034.
Translation of Search Report issued in application No. PCT/EP2020/059034.
International Preliminary Examination Report issued in application No. PCT/EP2020/059034.
IEEE 802.15.4w-2020; "IEEE Standard for Low-Rate Wireless Networks. Amendment 2: Low Power Wide Area Network (LPWAN) Extension to the Low-Energy Critical Infrastructure Monitoring (LECIM) Physical Layer (Phy);" IEEE Computer Society Standards; 2020; pp. 1-46.
ETSI TS 103 357 V1.1.1; "Short Range Devices; Low Throughput Networks (LTN); Protocols for radio interface A;" Technical Specification; Jun. 2018; pp. 1-113.
Konflikte zwischen WLAN und Bluetooth, https://www.pcwelt.de/ratgeber/Konflikte-zwischen-WLAN-und-Bluetooth-242893.Html; pp. 1.
Kilian, G., et al.; "Improved coverage for low-power telemetry systems using telegram splitting;" Proceedings of 2013 European Conference on Smart Objects, Systems and Technologies (SmartSys Tech); Jun. 2013; pp. 1-6.
Kilian, G., et al.; "Increasing Transmission Rehability for Telemetry Systems Using Telegram Splitting;" IEEE Transactions on Communications; vol. 63; No. 3; Mar. 2015; pp. 949-961.

* cited by examiner

320

Transmitting data depending on an operating mode of the participant using a first radio network or a second radio network in a frequency band, wherein in the first radio network data are transmitted according to a first time and/or frequency hopping pattern in a first frequency range of the frequency band, wherein in the second radio network data are transmitted according to a second time and/or frequency hopping pattern in a second frequency range of the frequency band, wherein the first time and/or frequency hopping pattern and the second time and/or frequency hopping pattern are different — 322

Transmitting data using a first radio network and a second radio network in a frequency band, wherein in the first radio network data are transmitted according to a first time and/or frequency hopping pattern in a first frequency range of the frequency band, wherein in the second radio network data are transmitted according to a second time and/or frequency hopping pattern in a second frequency range of the frequency band, wherein the first time and/or frequency hopping pattern and the second time and/or frequency hopping pattern are different — 332

Transmitting data between participants and/or a base station of the communication system using a first radio network and a second radio network in a frequency band, wherein in the first radio network data are transmitted according to a first time and/or frequency hopping pattern in a first frequency range of the frequency band, wherein in the second radio network data are transmitted according to a second time and/or frequency hopping pattern in a second frequency range of the frequency band, wherein the first time and/or frequency hopping pattern and the second time and/or frequency hopping pattern are different ~342

Transmitting data in the first communication system using a first radio network in the frequency band, wherein in the first radio network, the frequency band is accessed based on a first time and/or frequency hopping pattern ~352

Transmitting data in the second communication system using a second radio network in the frequency band, wherein in the second radio network, the frequency band is accessed based on a second time and/or frequency hopping pattern, wherein the first radio network and the second radio network are different, wherein the first time and/or frequency hopping pattern and the second time and/or frequency hopping pattern are different ~354

Fig. 12

SYSTEM COMBINATION OF AN ASYNCHRONOUS AND A SYNCHRONOUS RADIO SYSTEM

CROSS-REFERENCE TO RELATED APPLICATIONS

This application is a continuation of copending International Application No. PCT/EP2020/059034, filed Mar. 31, 2020, which is incorporated herein by reference in its entirety, and additionally claims priority from German Application No. 10 2019 204 916.8, filed Apr. 5, 2019, which is also incorporated herein by reference in its entirety.

BACKGROUND OF THE INVENTION

Embodiments of the present invention relate to a participant of a communication system and, in particular, to a participant transmitting data using two different radio networks. Other embodiments relate to a corresponding base station, a corresponding communication system, and corresponding methods. Some embodiments relate to a system combination of an asynchronous and synchronous radio system.

In conventional IoT (Internet of Things) systems, there are two options for system implementation. Data transmission can be either synchronous or asynchronous.

Examples of asynchronous systems are LoRa (LoRa=Long Range Wide Area Network) and MIOTY [1], [2], [3], [6]. These systems have the advantage of high energy efficiency on the side of the terminal devices, since these can send their data to the respective base station at any point in time without having to listen to the channel or synchronize to the respective base station beforehand.

Due to the asynchronous access to the channel, however, interference with other participants can occur in asynchronous systems so that the message may not be correctly decoded at the receiver. The so-called telegram splitting multiple access (TSMA) method [1], [2], [3], [6] was developed for this case of application, with which these interferences can be tolerated.

Another advantage of asynchronous transmission is the short latency with which a message can be transmitted from a participant to the base station. This is due to the asynchronous procedure since the participant can access the channel directly without any waiting times due to coordination.

However, due to the high energy efficiency and the asynchronous access of the participants to the channel, it is not possible in most systems of this type to send a message from the base station to the participant(s) (downlink) at any time.

The advantages of a synchronous system are the latency times that can be calculated in advance, since the base station knows at any time when a participant can send data to the base station and also when the base station can send data to each participant.

Compared to an asynchronous system, the downlink latency times can therefore be calculated and are not only dependent on the participant. In addition, it is possible to address more participants in the downlink compared to the asynchronous system. In the asynchronous system, for example, it is not possible to address 300 participants in the downlink in 30 seconds.

Thus, the object underlying the present invention is providing a concept which improves a utilization of the communication channel in a communication system (e.g. IoT system) having a plurality of battery-powered or energy harvesting-based participants.

SUMMARY

An embodiment may have a participant of a communication system, wherein the participant is configured to transmit data using a first radio network and a second radio network in the same frequency band, wherein the participant is configured to transmit data in the first radio network according to a first time/frequency hopping pattern in a first frequency range of the frequency band, wherein the participant is configured to transmit data in the second radio network according to a second time/frequency hopping pattern in a second frequency range of the frequency band, wherein the first time/frequency hopping pattern and the second time/frequency hopping pattern are different, wherein the first frequency range and the second frequency range overlap at least partially, wherein the first radio network is an asynchronous radio network in which participants of the communication system are able to transmit data to the base station at any points in time, wherein the second radio network is a synchronous radio network in which exclusive resources to transmit the data are allocated to the participants, wherein the participant is configured to transmit an asynchronous uplink data transmission to a base station of the communication system using the first radio network and to receive a downlink data transmission from the base station synchronized in time with the transmitted uplink data transmission using the first radio network, the downlink data transmission having signaling information, wherein the participant is configured to receive, based on the signaling information, at least one beacon transmitted by the base station using the second radio network to switch to the second radio network, wherein the signaling information have information on a point in time and/or a frequency channel of the at least one beacon.

Another embodiment may have a base station, wherein the base station is configured to transmit data using a first radio network and a second radio network in the same frequency band, wherein the base station is configured to transmit data in the first radio network according to a first time/frequency hopping pattern in a first frequency range of the frequency band, wherein the base station is configured to transmit data in the second radio network according to a second time/frequency hopping pattern in a second frequency range of the frequency band, wherein the first time/frequency hopping pattern and the second time/frequency hopping pattern are different, wherein the first frequency range and the second frequency range overlap at least partially, wherein the first radio network is an asynchronous radio network in which participants of the communication system are able to transmit data to the base station at any points in time, wherein the second radio network is a synchronous radio network in which the base station allocates exclusive resources to transmit the data to the participants of the communication system, wherein the base station is configured to receive an asynchronous uplink data transmission from a participant of the communication system using the first radio network and to transmit a downlink data transmission to the participant synchronized in time with the received uplink data transmission using the first radio network, the downlink data transmission having signaling information on a transmission of at least one beacon, wherein the base station is configured to transmit the at least one beacon for synchronizing participants of the second radio network using the second radio network, wherein the signaling information have information on a point in time and/or a frequency channel of the at least one beacon.

Still another embodiment may have a method of operating a communication system, having: transmitting data between participants and a base station of the communication system using a first radio network and a second radio network in a frequency band, wherein, in the first radio network, data are transmitted according to a first time/frequency hopping pattern in a first frequency range of the frequency band, wherein, in the second radio network, data are transmitted according to a second time/frequency hopping pattern in a second frequency range of the frequency band, wherein the first time/frequency hopping pattern and the second time/frequency hopping pattern are different, wherein the first frequency range and the second frequency range overlap at least partially, wherein the first radio network is an asynchronous radio network in which participants of the communication system are able to transmit data to the base station at any points in time, wherein the second radio network is a synchronous radio network in which exclusive resources to transmit the data are allocated to the participants, transmitting an asynchronous uplink data transmission from a participant of the communication system to the bases station using the first radio network, transmitting a downlink data transmission from the base station to the participant synchronized in time with the received uplink data transmission using the first radio network, the downlink data transmission having signaling information on a transmission of at least one beacon, transmitting a beacon from the base station to the participants for synchronizing the participants of the second radio network, using the second radio network, wherein the signaling information have information on a point in time and/or a frequency channel of the at least one beacon.

Embodiments provide a participant of a communication system, the participant being configured to transmit [e.g. send and/or receive] data using a first radio network and a second radio network in a [e.g. the same] frequency band [e.g. used by a plurality of communication systems; e.g. the ISM band], wherein the participant is configured to transmit data in the first radio network according to a first time and/or frequency hopping pattern in a first frequency range of the frequency band, wherein the participant is configured to transmit data in the second radio network according to a second time and/or frequency hopping pattern in a second frequency range of the frequency band, the first time and/or frequency hopping pattern and the second time and/or frequency hopping pattern being different, wherein the first frequency range and the second frequency range overlap at least partially.

In embodiments, the participant may be configured to switch during operation between a first operating mode in which the participant transmits data using the first radio network, and a second operating mode in which the participant transmits data using the second radio network.

In embodiments, the participant may be configured to select an operating mode from the first operating mode and the second operating mode depending on received signaling information [e.g. signaling the operating mode to be used from the first operating mode and the second operating mode].

For example, the signaling information may be emitted from a base station or a central control unit of the communication system.

In embodiments, the participant may be configured to select an operating mode from the first operating mode and the second operating mode depending on at least one transmission requirement [e.g. latency, transmission security, QoS] of the data to be transmitted and/or depending on at least one operating parameter [e.g. available power] of the participant.

For example, the participant may be configured to select the operating mode [e.g. use of the first or second radio network] for a transmission so as to best meet requirements for, e.g. latency, transmission reliability, response capability, or addressed receiver range [e.g. for point-to-multipoint transmissions].

In embodiments, the participant may be configured to obtain signaling information signaling an availability of the first and/or second radio network [e.g. time constraints], using the first and/or second radio network [e.g. using the respective other radio network], wherein the participant is configured to select an operating mode [e.g. corresponding to the time availability of a radio network] from the first operating mode and the second operating mode based on the signaling information.

For example, the signaling information may be emitted from a base station or a central control unit of the communication system.

In embodiments, the participant may be configured to obtain information [e.g. system parameters of the second radio network, such as the second frequency range, the second time and/or frequency hopping pattern, etc.] used for communication in the second radio network, using the first radio network [e.g. upon logging into the first radio network].

In embodiments, the participant may be configured to obtain information [e.g. system parameters of the first radio network, such as the first frequency range, the first time and/or frequency hopping pattern, etc.] used for communication in the first radio network, using the second radio network [e.g. upon logging into the second radio network].

In embodiments, the participant may be configured to transmit data to a base station or another participant of the communication system at a first point in time using the first radio network and to transmit data to the same base station or the same other participant at a second point in time using the second radio network [e.g. wherein the first point in time and the second point in time are different].

In embodiments, the participant may be configured to transmit data using the first radio network and to receive data using the second radio network.

In embodiments, the participant may be configured to transmit data using the second wireless network and to receive data using the first wireless network.

In embodiments, the first radio network may be an asynchronous radio network.

In embodiments, the second radio network may be a synchronous radio network.

In embodiments, the participant may be configured to transmit an asynchronous uplink data transmission to a base station of the communication system using the first radio network and to receive a downlink data transmission from the base station synchronized in time with the transmitted uplink data transmission using the first radio network, wherein the downlink data transmission comprises signaling information, wherein the participant may be configured to receive, based on the signaling information, at least one beacon transmitted by the base station using the second radio network to switch to the second radio network.

In embodiments, the signaling information may comprise information on a point in time of the at least one beacon.

In embodiments, the signaling information may comprise information on a frequency channel of the at least one beacon.

In embodiments, the signaling information may comprise information on at least one beacon transmission parameter [e.g. system parameter], wherein the at least one beacon transmission parameter is at least one of:
- a time/frequency hopping pattern of the at least one beacon,
- a calculation rule for the points in time and/or frequency channels and/or time/frequency hopping patterns of the transmission of the at least one beacon,
- a time interval between successive transmissions of the beacon,
- a calculation rule for the time intervals between successive transmissions of the beacon,
- a cryptographic key for the transmission of the beacon, and
- a calculation rule for generating a cryptographic key for the transmission of the at least one beacon.

In embodiments, the participant may be configured to, upon non-reception of at least one beacon transmitted using the second radio system, transmit a new uplink data transmission to the base station using the first radio network, and to receive a further downlink data transmission from the base station synchronized in time with the transmitted uplink data transmission using the first radio network, wherein the further downlink data transmission comprises signaling information, wherein the participant may be configured to receive again, based on the signaling information, at least one beacon transmitted by the base station using the second radio network, in order to switch again to the second radio network.

In embodiments, the first radio network and the second radio network may be based on different radio standards.

In embodiments, the first radio network may be based on the radio network specified in ETSI TS 103 357.

In embodiments, the second radio network may be based on the radio network specified in IEEE 802.15.4w.

In embodiments, the participant may be configured to negotiate an individual cryptographic key for use of the first wireless network [e.g. with the base station or other central control unit of the communication system], or wherein the participant has a pre-known individual cryptographic key for use of the first radio network, wherein the participant may be configured to receive a cryptographic key for use of the second wireless network via an encrypted transmission using the first wireless network.

In embodiments, the data may comprise a data packet, wherein the participant is configured to transmit [e.g. send and/or receive] the data packet [e.g. of the physical layer in the OSI model] divided into a plurality of sub-data packets, the plurality of sub-data packets each being shorter than the data packet, wherein the participant is configured to transmit the plurality of sub-data packets according to the respective time and/or frequency hopping pattern [e.g. wherein the plurality of sub-data packets are not transmitted contiguously, e.g. but with transmission-free intervals between the sub-data packets].

In embodiments, the frequency band may be accessed by the first radio network based on a first channel access pattern indicating a first usable frequency and/or time hopping-based occupancy of the frequency band, wherein the frequency band may be accessed by the second radio network based on a second channel access pattern indicating a second usable frequency and/or time hopping-based occupancy of the frequency band, wherein the first channel access pattern and the second channel access pattern are different [e.g. wherein the one first usable frequency and/or time hopping-based occupancy of the frequency band is different from the second usable frequency and/or time hopping-based occupancy of the frequency band], wherein the participant may be configured to transmit [send and/or receive] the data in the first radio network according to the first time and/or frequency hopping pattern, wherein the first time and/or frequency hopping pattern is a [e.g. real] subset of the usable frequency and/or time hopping-based occupancy of the frequency band indicated by the first channel access pattern, wherein the participant may be configured to transmit the data in the second radio network according to the second time and/or frequency hopping pattern, the second time and/or frequency hopping pattern indicating a [e.g. real] subset of the usable frequency and/or time hopping-based occupancy of the frequency band indicated by the second channel access pattern.

Further embodiments provide a base station, wherein the base station is configured to transmit [e.g. send and/or receive] data using a first radio network and a second radio network in a [e.g. the same] frequency band [e.g. which is used by a plurality of communication systems; e.g. the ISM band], the base station being configured to transmit data in the first radio network according to a first time and/or frequency hopping pattern in a first frequency range of the frequency band, the base station being configured to transmit data in the second radio network according to a second time and/or frequency hopping pattern in a second frequency range of the frequency band, the first time and/or frequency hopping pattern and the second time and/or frequency hopping pattern being different, wherein the first frequency range and the second frequency range overlap at least partially.

In embodiments, the first radio network may be an asynchronous radio network.

In embodiments, the second radio network may be a synchronous radio network.

In embodiments, the base station may be configured to transmit at least one beacon for synchronizing participants of the second radio network [e.g. participants of the communication system using the second radio network [e.g. transmitting data using the second radio network]], using the second radio network.

For example, the base station may be configured to emit a plurality of beacons at certain intervals using the second radio network.

For example, the base station may be configured to emit the beacons on a regular basis or based on a beacon transmission pattern [e.g. known in the second radio network], which may be communicated to the participants, for example, in the form of signaling information with a downlink data transmission.

Furthermore or alternatively, each beacon may include information on a transmission of one or more subsequent beacons, such as a point in time (or points in time), a frequency channel (or channels), and/or a hopping pattern (or patterns) of the transmission of the subsequent beacon (or the plurality of subsequent beacons). It is also possible for the information used to receive the subsequent beacon(s) to be derived from information transmitted with the beacon, such as a state of a random number generator, such as a pseudorandom binary sequence (PRBS) generator, based on which the transmissions of the beacons are distributed pseudorandomly in time and/or frequency. In these cases, the transmission of the next beacon can be signaled to the participants of the communication system, for example, by means of the signaling information of the downlink data transmission.

In embodiments, the base station may be configured to emit the at least one beacon only when needed [e.g. when there are insufficient resources available in the first radio network for the communication system].

In embodiments, the base station may be configured to receive an asynchronous uplink data transmission from a participant of the communication system using the first radio network and to send a downlink data transmission to the participant synchronized in time with the received uplink data transmission using the first radio network, the downlink data transmission comprising signaling information on a transmission of at least one beacon, wherein the base station may be configured to send the at least one beacon using the second radio network [e.g. according to the signaling information].

In embodiments, the signaling information may include information on a point in time of the at least one beacon.

In embodiments, the signaling information may comprise information on a frequency channel of the at least one beacon.

In embodiments, the signaling information may comprise information on at least one beacon transmission parameter [e.g. system parameter], wherein the at least one beacon transmission parameter is at least one of:
- a time/frequency hopping pattern of the at least one beacon,
- a calculation rule for the points in time and/or frequency channels and/or time/frequency hopping patterns of the transmission of the at least one beacon,
- a time interval between successive transmissions of the beacon,
- a calculation rule for the time intervals between successive transmissions of the beacon,
- a cryptographic key for the transmission of the beacon, and
- a calculation rule for generating a cryptographic key for the transmission of the at least one beacon.

In embodiments, the base station may be configured to emit a plurality of beacons using the second radio network [e.g. to synchronize the participants of the communication system] at certain intervals, wherein the signaling information comprise information on transmitting at least one next beacon of the plurality of beacons.

In embodiments, the base station may be configured to receive a further uplink data transmission from the participant of the communication system using the first radio network, and to transmit a further downlink data transmission to the participant synchronized in time with the received further uplink data transmission using the first radio network, the further downlink data transmission comprising signaling information on the transmission of the next beacon, In embodiments, the base station may be configured to negotiate an individual cryptographic key for communicating with a participant by means of the first wireless network [e.g. with the participant], or wherein the base station has a pre-known individual cryptographic key for communicating with a participant by means of the first wireless network, wherein the base station may be configured to transmit a cryptographic key for using the second wireless network to a participant via an encrypted transmission using the first radio network.

In embodiments, the base station may be configured to renew and/or modify at least one cryptographic key used to encrypt data transmitted using the second radio network, using a cryptographically encrypted transmission in the first radio network.

In embodiments, the base station may be configured to detect compromising or potential compromising of a cryptographic key for encrypting data transmitted using the second radio network [e.g. by detecting targeted interference or erroneous data, or by side-channel information on a change in trustworthiness of a participant in possession of the key], and to issue [e.g. distribute to the participants of the communication system] a new cryptographic key in response to the detection.

In embodiments, the base station may be configured to simultaneously transmit [e.g. send and/or receive] data using the first radio network and the second radio network.

For example, the base station may simultaneously transmit data [e.g. a first data packet] to one or more participants of the communication system using the first radio network and simultaneously transmit data [e.g. a second data packet] to another one or more participants of the communication system using the second radio network.

In embodiments, the base station may be configured to transmit signaling information signaling a radio network to be used from the first radio network and the second radio network, to at least one participant of the communication system.

For example, the base station may transmit a downlink data transmission [e.g. using a currently used radio network from the first radio network and the second radio network] with the signaling information to the at least one participant.

In embodiments, the base station may be configured to select one of the radio networks for transmitting data [e.g. a data packet] to be transmitted from the first radio network and the second radio network depending on transmission requirements [e.g. latency, transmission security, QoS] of the data to be transmitted and/or depending on operational parameters [e.g. available power] of a participant of the communication system which is to receive the data.

In embodiments, the base station may be configured to transmit signaling information signaling an availability of the first and/or second radio network [e.g. time constraints], to at least one participant of the communication system using the first and/or second radio network [e.g. using the respective other radio network].

In embodiments, the base station may be configured to transmit information [e.g. system parameters of the second radio network, such as the second frequency range, the second time and/or frequency hopping pattern, etc.] used for communication in the second radio network to at least one participant of the communication system [e.g. upon logging into the first radio network by the respective participant] using the first radio network [e.g. upon logging into the first radio network].

In embodiments, the base station may be configured to transmit information [e.g. system parameters of the first radio network, such as the first frequency range, the first time and/or frequency hopping pattern, etc.] used for communication in the first radio network, to at least one participant of the communication system using the second radio network [e.g. upon logging into the second radio network by the respective participant].

In embodiments, the base station may be configured to temporarily cease operation of the first radio network or the second radio network [e.g. only transmit and receive transmissions using the first radio network or the second radio network].

In embodiments, the base station may be configured to temporally cease operation of the first radio network and/or the second radio network in dependence on at least one of:
- a current or expected transmission volume,
- current or expected transmission requirements to latency,
- current or expected transmission requirements to response capability,
- current or expected transmission requirements to transmission security,
- current or expected transmission requirements to an addressable receiver group [e.g. a point-to-multipoint transmission],
- a number of registered participants,
- types and/or kinds [e.g. ability to send or receive transmissions in the first or second radio network] of the registered participants,
- a channel load [e.g. existing external systems] within the frequency range used, and
- existing interference within the frequency range used.

In embodiments, the base station may be configured to dynamically allocate resources to the first and/or second radio networks, wherein resources are at least one of:
- frequency channels,
- time slots,
- time/frequency hopping patterns, and
- transmission power.

In embodiments, the first radio network and the second radio network may be based on different radio standards.

In embodiments, the first radio network is based on the radio network specified in ETSI TS 103 357.

In embodiments, the second radio network may be based on the radio network specified in IEEE 802.15.4w.

In embodiments, the data may comprise a data packet, wherein the base station is configured to transmit [e.g. send and/or receive] the data packet [e.g. of the physical layer in the OSI model] divided into a plurality of sub-data packets, the plurality of sub-data packets each being shorter than the data packet, wherein the participant is configured to transmit the plurality of sub-data packets according to the respective time and/or frequency hopping pattern [e.g. wherein the plurality of sub-data packets are not transmitted contiguously, e.g. but with transmission-free intervals between the sub-data packets].

In embodiments, the frequency band may be accessed by the first radio network based on a first channel access pattern indicating a first usable frequency and/or time hopping-based occupancy of the frequency band, wherein the frequency band may be accessed by the second radio network based on a second channel access pattern indicating a second usable frequency and/or time hopping-based occupancy of the frequency band, wherein the first channel access pattern and the second channel access pattern are different [e.g. wherein the one first usable frequency and/or time hopping-based occupancy of the frequency band is different from the second usable frequency and/or time hopping-based occupancy of the frequency band], wherein the base station may be configured to transmit the data in the first radio network according to the first time and/or frequency hopping pattern, wherein the first time and/or frequency hopping pattern indicates a [e.g. real] subset of the usable frequency and/or time hopping-based occupancy of the frequency band indicated by the first channel access pattern, wherein the base station may be configured to transmit the data in the second radio network according to the second time and/or frequency hopping pattern, the second time and/or frequency hopping pattern indicating a [e.g. real] subset of the usable frequency and/or time hopping-based occupancy of the frequency band indicated by the second channel access pattern.

Further embodiments provide a communication system comprising at least one base station and one or more participants, the communication system being configured to transmit data between the participants and/or the base station using a first radio network and a second radio network in a frequency band [e.g. which is used by a plurality of communication systems; e.g. the ISM band], wherein in the first radio network data are transmitted according to a first time and/or frequency hopping pattern in a first frequency range of the frequency band, wherein in the second radio network data are transmitted according to a second time and/or frequency hopping pattern in a second frequency range of the frequency band, wherein the first time and/or frequency hopping pattern and the second time and/or frequency hopping pattern are different, wherein the first frequency range and the second frequency range overlap at least partially.

In embodiments, the first radio network may be an asynchronous radio network.

In embodiments, the second radio network may be a synchronous radio network.

In embodiments, the first time and/or frequency hopping pattern of the first radio network and the second time and/or frequency hopping pattern of the second radio network may be selected so as to avoid a total failure of data transmission due to mutual interference.

In embodiments, in the first radio network, data may be transmitted according to a first channel access pattern, the first channel access pattern indicating a usable frequency and/or time hopping-based occupancy of the first frequency range, the first time and/or frequency hopping pattern indicating a subset of the usable frequency and/or time hopping-based occupancy of the first frequency range indicated by the first channel access pattern, wherein in the second radio network data may be transmitted according to a second channel access pattern, the second channel access pattern indicating a usable frequency and/or time hopping-based occupancy of the second frequency range, the first time and/or frequency hopping pattern indicating a subset of the usable frequency and/or time hopping-based occupancy of the first frequency range indicated by the first channel access pattern, wherein the first channel access pattern and the second channel access pattern are different.

In embodiments, the first radio network and the second radio network may be based on different radio standards.

In embodiments, the first radio network may be based on the radio network specified in ETSI TS 103 357.

In embodiments, the second radio network may be based on the radio network specified in IEEE 802.15.4w.

Further embodiments provide a communication arrangement comprising a first communication system and a second communication system, the first communication system and the second communication system being configured to communicate wirelessly in the same frequency band, the first communication system being configured to transmit data using a first radio network in the frequency band [e.g. in a first frequency range of the frequency band], the second communication system being configured to transmit data using a second radio network in the frequency band [e.g. in a second frequency range of the frequency band that at least partially overlaps the first frequency range], wherein, in the first radio network, the frequency band is accessed based on a first time and/or frequency hopping pattern, wherein, in the second radio network, the frequency band is accessed based on a second time and/or frequency hopping pattern [e.g.

channel access pattern], wherein the first radio network and the second radio network are different, wherein the first time and/or frequency hopping pattern and the second time and/or frequency hopping pattern are different, wherein the first time and/or frequency hopping pattern and the second time and/or frequency hopping pattern are selected such that a total failure of data transmission due to mutual interference is avoided.

In embodiments, the first time and/or frequency hopping pattern and the second time and/or frequency hopping pattern may comprise such a high degree of orthogonality to achieve a guaranteed QoS without external interference.

In embodiments, the first radio network may be an asynchronous radio network.

In embodiments, the second radio network may be a synchronous radio network.

In embodiments, the first radio network and the second radio network may be based on different radio standards.

In embodiments, the first radio network may be based on the radio network specified in ETSI TS 103 357.

In embodiments, the second radio network may be based on the radio network specified in IEEE 802.15.4w.

Further embodiments provide a method of operating a participant of a communication system. The method comprises a step of transmitting data in dependence on an operating mode of the participant using a first radio network or a second radio network in a [e.g. the same] frequency band [e.g. used by a plurality of communication systems; e.g. the ISM band], wherein, in the first radio network, data are transmitted according to a first time and/or frequency hopping pattern in a first frequency range of the frequency band, wherein, in the second radio network, data are transmitted according to a second time and/or frequency hopping pattern in a second frequency range of the frequency band, wherein the first time and/or frequency hopping pattern and the second time and/or frequency hopping pattern are different, wherein the first frequency range and the second frequency range overlap at least partially.

Further embodiments provide a method of operating a base station of a communication system. The method comprises a step of transmitting data using a first radio network and a second radio network in a [e.g. the same] frequency band [e.g. used by a plurality of communication systems; e.g. the ISM band], wherein, in the first radio network, data are transmitted according to a first time and/or frequency hopping pattern in a first frequency range of the frequency band, wherein, in the second radio network, data are transmitted according to a second time and/or frequency hopping pattern in a second frequency range of the frequency band, wherein the first time and/or frequency hopping pattern and the second time and/or frequency hopping pattern are different, wherein the first frequency range and the second frequency range overlap at least partially.

Further embodiments provide a method of operating a communication system. The method comprises a step of transmitting data between participants and/or a base station of the communication system using a first radio network and a second radio network in a frequency band [e.g. which is used by a plurality of communication systems; e.g. the ISM band], wherein, in the first radio network, data are transmitted according to a first time and/or frequency hopping pattern in a first frequency range of the frequency band, wherein, in the second radio network, data are transmitted according to a second time and/or frequency hopping pattern in a second frequency range of the frequency band, wherein the first time and/or frequency hopping pattern and the second time and/or frequency hopping pattern are different, wherein the first frequency range and the second frequency range overlap at least partially.

Further embodiments create a method of operating two communication systems in a frequency band used by a plurality of communication systems for wireless communication. The method comprises a step of transmitting data in the first communication system using a first radio network in the frequency band [e.g. in a first frequency range of the frequency band]. The method further comprises a step of transmitting data in the second communication system using a second radio network in the frequency band [e.g. in a first frequency range of the frequency band], wherein, in the first radio network, the frequency band is accessed based on a first time and/or frequency hopping pattern [e.g. channel access pattern], wherein, in the second radio network, the frequency band is accessed based on a second time and/or frequency hopping pattern [e.g. channel access pattern], wherein the first radio network and the second radio network are different, wherein the first time and/or frequency hopping pattern and the second time and/or frequency hopping pattern are different, wherein the first time and/or frequency hopping pattern and the second time and/or frequency hopping pattern are selected such that a total failure of data transmission due to mutual interference is avoided.

Embodiments of the present invention combine the advantages of an asynchronous system and a synchronous system, or avoid the disadvantages of the asynchronous system and the synchronous system.

Particularly in the case of special events, such as so-called events, it may happen that many participants are to be supplied in the downlink, which would not be possible using a purely asynchronous system. Typical applications in the IoT environment are, for example, a firmware update, warning for firefighters, or switch-on/switch-off of all lamps.

BRIEF DESCRIPTION OF THE DRAWINGS

Embodiments of the present invention are described in more detail with reference to the accompanying figures, in which:

FIG. 9 shows a flowchart of a method of operating a participant of a communication system, according to an embodiment of the present invention;

FIG. 10 shows a flowchart of a method of operating a base station of a communication system, according to an embodiment of the present invention;

FIG. 11 shows a flowchart of a method of operating a communication system, according to an embodiment of the present invention; and FIG. 12 shows a flowchart of a method of operating two communication systems in one frequency band, according to an embodiment of the present invention.

DETAILED DESCRIPTION OF THE INVENTION

In the following description of the embodiments of the present invention, the same or similarly acting elements are given the same reference sign in the figures, so that their description is interchangeable.

Figure 1:
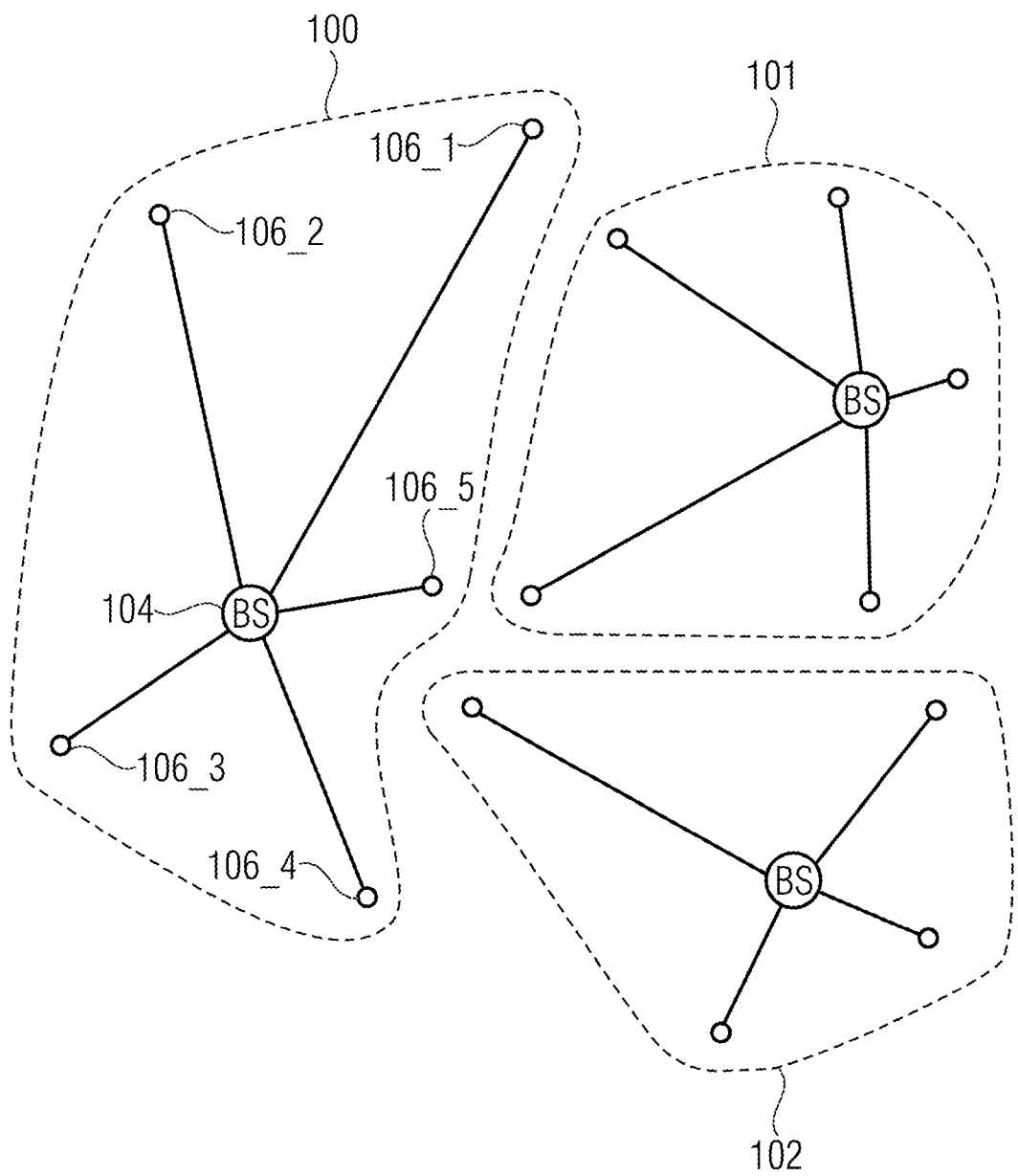
FIG. 1 shows a schematic view of a communication system and two other communication systems, according to an embodiment of the present invention.

FIG. 1 shows a schematic view of a communication system 100 and two other communication systems 101 and 102, according to an embodiment of the present invention.

The communication system 100 may comprise a base station 104 (or optionally several base stations) and one or several participants (e.g. terminal points) 106_1-106_*n*, wherein n is a natural number larger than one. In the embodiment shown in FIG. 1, for illustration purposes, the communication system 100 comprises five participants 106_1-106_5, however, the communication system 104_1 may also comprise 1, 10, 100, 1,000, 10,000 or even 100,000 participants.

The communication system 100 may be configured to communicate wirelessly in a frequency band (e.g. a license-free and/or permission-free frequency band such as the ISM band) used for communication by a plurality of mutually uncoordinated communication systems, as is exemplarily indicated in FIG. 1 by the other communication systems 101 and 102.

In this regard, the frequency band used by the communication system 100 may have a bandwidth substantially (e.g. by at least a factor of 5 (or 10)) greater than receive filters of the receivers (receivers or transceivers) typically used in the participants 106_1-106_*n*.

The communication system shown in FIG. 1 may, for example, be an IoT system, wherein the participants 106_1-106_*n* of the communication system 100 may, for example, be actuator nodes and/or sensor nodes, such as heating meters, motion detectors, smoke detectors, etc.

In embodiments, two different radio networks that access the same frequency band (e.g. a license-free and/or permission-free frequency band such as the ISM band) may be used within the communication system 100 to transmit data.

As used herein, a radio network may refer to the communication procedures (e.g. frequencies, times, resources, modulation, data rates, etc.) agreed upon between the participants 106_1-106_*n* and the base station 104, such as those specified in radio standards (e.g. ETSI, IEEE, 3GPPP).

In embodiments, the first radio network may thus be based on a first radio standard, for example communicate according to a first radio standard, and the second radio network may be based on a second radio standard, for example communicate according to a second radio standard, wherein the first radio standard and the second radio standard may be different. For example, the first radio standard may be based on asynchronous transmission and the second radio standard may be based on synchronous transmission.

Figure 2:
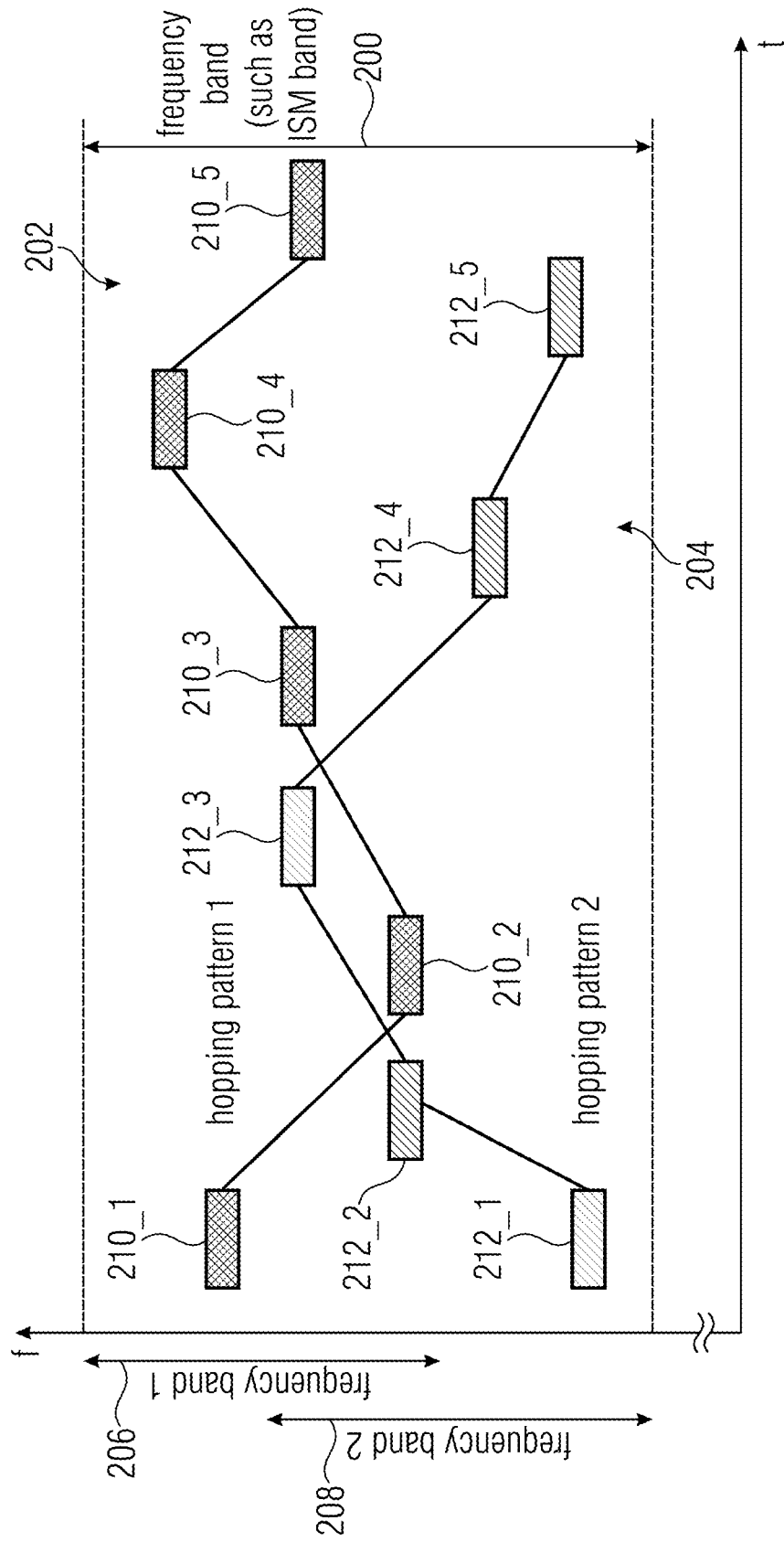
FIG. 2 shows, in a diagram, an occupancy of the frequency band when transmitting data in a first radio network according to a first time and/or frequency hopping pattern and transmitting data in a second radio network according to a second time and/or frequency hopping pattern, according to an embodiment of the present invention.

According to embodiments, in order to separate transmission of data using a first radio network of the two radio networks, and transmission of data using a second radio network of the two radio networks, the two radio networks may use different time and/or frequency hopping patterns (or channel access patterns), as exemplified in FIG. 2.

FIG. 2 shows, in a diagram, an occupancy of the frequency band 200 when transmitting data in a first radio network according to a first time and/or frequency hopping pattern 202 and the transmission of data in a second radio network according to a second time and/or frequency hopping pattern 204, according to an embodiment of the present invention. Here, the ordinate describes the frequency and the abscissa describes the time.

As can be seen in FIG. 2, the first time and/or frequency hopping pattern 202 and the second time and/or frequency hopping pattern 204 can be different, e.g. so that (sub-)data packets 210_1-210_5, which are transmitted using the first radio network according to the first time and/or frequency hopping pattern 202, and (sub-)data packets 212_1-212_5, which are transmitted using the second radio network according to the second time and/or frequency hopping pattern 202, do not overlap (see FIG. 2) or at most overlap to such an extent that error-free decoding of the data to be transmitted with the respective (sub-)data packets is possible at the receiver end.

An occupancy of resources indicated by the first time and/or frequency hopping pattern 202 and an occupancy of resources indicated by the second time and/or frequency hopping pattern may thus differ (e.g. completely or at least partially, such as more than 50% (or 60%, or 70%, or 80%, or 90%)).

As can further be seen in FIG. 2, a first frequency range 206 (e.g. a first (e.g. contiguous) group of frequency channels) of the frequency band 200 may be occupied by the first time and/or frequency hopping pattern 202 and a second frequency range 208 (e.g. a second (e.g. contiguous) group of frequency channels) of the frequency band may be occupied by the second time and/or frequency hopping pattern 204, wherein the first frequency range 206 and the second frequency range 208 overlap at least partially.

The first frequency range 206 and/or the second frequency range 208 may have a bandwidth substantially (e.g. by at least a factor of 5 (or 10)) greater than receive filters of the receivers (receivers or transceivers) of the participants 106_1-106_*n*.

In embodiments, the first radio network and the second radio network may be used in parallel (e.g. simultaneously or at least overlapping in time (see FIG. 2)) in the communication system 100. For example, it is possible that the first radio network is used to transmit data between the base station 104 and a first participant 106_1 or a first group of participants (e.g. 106_1-106_3), while the second radio network is used to transmit data between the base station 104 and a second participant 106_4 or a second group of participants (e.g. 106_4-106_5). It is also possible, for example, for the participants 106_1-106_n (and/or the base station 104) to switch between the first radio network (or a first operating mode in which data are transmitted using the first radio network), and the second radio network (or a second operating mode in which data are transmitted using the second radio network) during operation, for example at time t1 data may be transmitted between one of the participants 106_1 and the base station 104 or another participant 106_2 using the first radio network, while at time t2 data may be transmitted between the participant 106_1 and the base station 104 or the other participant 106_2 using the second radio network. Data may also be transmitted from a participant 106_1 or a group of participants 106_1-106_4 to the base station 104 using the first radio network while data are transmitted from the base station 104 to the participant 106_1 or the group of participants 106_1-106_4 using the second radio network, or vice versa.

In embodiments, the base station 104 (or another central control unit of the communication system 100) may transmit (e.g. by means of a downlink data transmission) signaling information signaling a radio network to be used among the first radio network and the second radio network, to a participant 106_1 or a group of participants 106_1-106_4, wherein the participant 106_1 or the group of participants 106_1-106_4 may switch to the signaled radio network in response to the signaling information. The base station 104 may select the radio network to be used depending on, for example, transmission requirements of the data to be transmitted (e.g. latency, transmission security, QoS) and/or depending on operating parameters of the participants (e.g. available power) and/or depending on a load of the respective radio network.

Of course, it is also possible that the participants themselves select the radio network to be used depending on the transmission requirements of the data to be transmitted (e.g. latency, transmission security, QoS) and/or depending on their own operating parameters (e.g. available energy).

In embodiments, the first radio network may be an asynchronous radio network.

In an asynchronous radio network, the participants 106_1-106_n of the communication system 100 may be configured to send data in an uncoordinated (e.g. and asynchronous) manner with respect to other participants and/or the base station 104 of communication system 100. For example, the participants 106_1-106_n may be configured to send data in specified rough intervals (e.g. hourly, daily, weekly, semi-annually, annually, etc.) or as a response to an external event (e.g. a deviation of a sensor value from a target value). In this case, the respective participant may itself determine the exact sending point in time and/or the exact frequency, or the exact frequency channel of the frequency band, for the transmission of the data. In this case, the respective participant sends the data regardless of whether another participant and/or the base station 104 transfers data at the same point in time or with a temporal overlap and/or on the same frequency, or on the same frequency channel of the frequency band.

In this case, the transmission of data (e.g. a data packet) from one of the participants 106_1-106_n, e.g. from the participant 106_1, to the base station 104 is referred to as the uplink data transmission, whereas the transmission of data from the base station 104 to one of the participants 106_1-106_n, e.g. to the participant 106_1, is referred to as the downlink data transmission. Accordingly, the uplink data transmission refers to (or includes) the transmission of an uplink data packet (or an uplink message) from the respective participant to the base station 104, whereas the downlink data transmission refers to (or includes) the transmission of a downlink data packet (or a downlink message) from the base station 104 to the respective participant.

Since the uplink data transmission of the respective participant 106_1-106_n takes place uncoordinatedly and the transmission/reception unit (transceiver) of the respective participant 106_1-106_n is usually only activated for the data transmission, the downlink data transmission to the respective participant takes place temporally synchronized to the uplink data transmission, i.e. after a specified time and/or frequency after the uplink data transmission, the respective participant activates its transmission/reception unit (transceiver) for a specified time interval (reception window) so as to receive the downlink data transmission that is transmitted (exactly) within this time interval by the base station 104 as a response to (e.g. as a reaction to) the uplink data transmission. Optionally, the downlink data transmission to the respective participant may also be synchronized in frequency to the respective uplink data transmission, e.g. it may be at the same frequency (in the same frequency channel) or with a specified frequency interval.

An example of such an asynchronous radio network is the radio network specified in ETSI TS 103 357 [6]. Of course, the asynchronous radio network can also be another asynchronous radio network, such as LoRa, Sigfox or WLAN.

In embodiments, the second radio network may be a synchronous radio network.

In a synchronous radio network, the participants 106_1-106_n are assigned (e.g. by base station 104) exclusive resources for transmitting data, i.e. the participants 106_1-106_n and the base station 104 know in advance in which resources to transmit or receive data.

In order to maintain the synchronization of the participants 106_1-106_n in a synchronous radio network, so-called beacons may be used, which are emitted, for example, by the base station 104 or another coordinating instance of the radio network. In this way, the beacons may be emitted periodically or based on a beacon transmission pattern known in the radio network, which may be communicated to the participants 106_1-106_n, for example, when registering. Further, it is possible that each beacon includes information on a transmission of a subsequent beacon or beacons, such as a time (or times), a frequency channel (or channels), and/or a hopping pattern (or patterns) of the transmission of the subsequent beacon (or beacons). Also, it is possible for the information used to receive one or more subsequent beacons to be derived from information transmitted with the beacon, such as a state of a random number generator, such as a pseudorandom binary sequence (PRBS) generator, based on which the transmissions of the beacons are distributed pseudorandomly in time and/or frequency.

For example, the beacons may have synchronization information, such as a synchronization sequence, based on which the participants 106_1-106_n may synchronize in the radio network. Based on the synchronization information, the participants 106_1-106_n may, for example, be able to compensate for any time and or frequency offsets (e.g. caused by favorable time and/or frequency generators).

The beacons may further (or alternatively) be used to coordinate the participants 106_1-106_n of the radio network. For example, the beacons may have coordination information using which resources to be used for transmission are allocated to one or more participants.

An example of such a synchronous radio network is the radio network specified in IEEE 802.15.4w. Of course, the synchronous radio network can also be another synchronous radio network, such as NB-IoT, GSM or LTE.

Optionally, the base station 104 and the participants 106_1-106_n of the communication system 100 may be configured to transmit data on the basis of the telegram splitting method. In this case, on the data transmitter side, the data to be transferred, e.g. a telegram or data packet (e.g. of the physical layer in the OSI model) such as an uplink data packet or a downlink data packet, is divided onto a plurality of sub-data packets (or partial data packets), and the sub-data packets are not transferred continuously, but distributed in time and/or in frequency according to a time and/or frequency hopping pattern, wherein the sub-data packets are merged (or combined) on the data receiver side so as to obtain the data packet. In this case, each of the sub-data packets only contains a part of the data packet. Furthermore, the data packet may be encoded (channel-encoded or error protection-encoded) so that not all of the sub-data packets are to faultlessly decode the data packet, but only a part of the sub-data packets is used.

The distribution of the plurality of sub-data packets in time and/or frequency may be according to a time and/or frequency hopping pattern, as mentioned above, wherein the time and/or frequency hopping patterns of the first radio network and the second radio network differ from each other, as explained above with reference to FIG. 2.

A time hopping pattern may indicate a sequence of transmission points in time or transmission time intervals with which the sub-data packets are transmitted. For example, a first sub-data packet may be transmitted at a first transmission point in time (or in a first transmission time slot), and a second sub-data packet may be transmitted at a second transmission point in time (or in a second transmission time slot), wherein the first transmission point in time and second transmission point in time are different. In this case, the time hopping pattern may define (or specify, or indicate) the first transmission point in time and the second transmission point in time. Alternatively, the time hopping pattern may indicate the first transmission point in time and a time interval between the first transmission point in time and the second transmission point in time. Obviously, the time hopping pattern may also only indicate the time interval between the first transmission point in time and the second transmission point in time. Between the sub-data packets, there may be transmission pauses in which no transmission takes place. The sub-data packets may also temporally overlap (coincide).

A frequency hopping pattern may indicate a sequence of transmission frequencies or transmission frequency hops with which the sub-data packets are transmitted. For example, a first sub-data packet may be transmitted at a first transmission frequency (or in a first frequency channel) and a second sub-data packet may be transmitted at a second transmission frequency (or in a second frequency channel), wherein the first transmission frequency and the second transmission frequency are different. In this case, the frequency hopping pattern may define (or specify, or indicate) the first transmission frequency and the second transmission frequency. Alternatively, the frequency hopping pattern may indicate the first transmission frequency and a frequency interval (transmission frequency hop) between the first transmission frequency and the second transmission frequency. Obviously, the frequency hopping pattern may also only indicate the frequency interval (transmission frequency hop) between the first transmission frequency and the second transmission frequency.

Obviously, the plurality of sub-data packets may also be transferred distributed in time and frequency. The distribution of the plurality of sub-data packets in time and frequency may be carried out according to a time and frequency hopping pattern. A time and frequency hopping pattern may be the combination of a time hopping pattern and a frequency hopping pattern, i.e. a sequence of transmission points in time or transmission time intervals with which the sub-data packets are transferred, wherein transmission frequencies (or transmission frequency hops) are assigned to the transmission points in time (or transmission time intervals).

In this case, a bandwidth of the occupancy of the frequency band indicated by the frequency hopping pattern may be significantly larger (e.g. at least by the factor 5 (or 10)) than a bandwidth of the reception filters of the receivers (receivers or transceivers) of the participants 106_1-106_n. To receive a telegram splitting-based data transfer, the respective participant may therefore be configured to switch, on the basis of the frequency hopping pattern (e.g. at the respective times or time slots indicated by the time hopping pattern), the reception frequency of its receiver to the respective frequencies or frequency channels of the frequency band indicated by the frequency hopping pattern so as to receive the plurality of sub-data packets.

Optionally, in embodiments, the frequency band 200 may be accessed by the respective radio network based on different channel access patterns. In other words, data transmissions of the first radio network (e.g. data transmissions between a first group of participants 106_1-106_3 and/or the base station 104 which were using the first radio network) and data transmissions of the second radio network (e.g. data transmissions between a second group of participants 106_3-106_5 and/or the base station 104 which were using the second radio network) may be separated from each other by different channel access patterns. By means of the different channel access patterns, the data transmissions of the respective radio networks can thereby be distributed in time and/or frequency in such a way that they do not overlap or at most overlap to such an extent that no total failure of the respective radio network occurs.

Specifically, a channel access pattern may indicate a frequency-based and/or time-hop-based occupancy (e.g. of resources) of the frequency band 200 (e.g. of the respective frequency range 206 and 208 of the frequency band 200) usable by the respective radio network. The time and/or frequency hopping pattern used by the respective participant 106_1-106_n or base station 104 to transmit data may indicate the frequency and/or time hopping-based occupancy to be used from among the usable frequency and/or time hopping-based occupancy of the respective radio network.

In the first radio network, data may thus be transmitted according to a first channel access pattern, the first channel access pattern indicating a usable frequency and/or time hopping-based occupancy of the frequency band 200. The first time and/or frequency hopping pattern 202, which may be used, for example, by the participant 106_1 or the base station 104 to transmit data, indicates a (real) subset of the usable frequency and/or time hopping-based occupancy of the frequency band 200 (e.g. of the first frequency range 206 of the frequency band 200) indicated by the first channel access pattern.

Likewise, data may be transmitted in the second radio network according to a second channel access pattern, the second channel access pattern indicating a usable frequency and/or time hopping-based occupancy of the frequency band 200. The second time and/or frequency hopping pattern 204, which may be used, for example, by the participant 106_4 or the base station 104 to transmit data, indicates a (real) subset of the usable frequency and/or time hopping-based occupancy of the frequency band 200 (e.g. of the second frequency range 208 of the frequency band 200) indicated by the second channel access pattern.

Of course, multiple time and/or frequency hopping patterns may be available in the respective radio network, based on which access to the time and/or frequency hopping-based occupancy of the frequency band 200 offered by the respective channel access pattern is performed.

Thus, a first set of time and/or frequency hopping patterns may be available to the participants 106_1-106_3 and/or the base station 104 which use the first radio network to transmit data, the time and/or frequency hopping patterns each indicating a (true) subset of the usable frequency and/or time hopping-based occupancy of the frequency band 200 (e.g. of the first frequency range 206 of the frequency band 200) indicated by the first channel access pattern. The time and/or frequency hopping patterns of the first set of time and/or frequency hopping patterns may differ from each other, for example in such a way that they do not overlap or at most overlap to such an extent that an error-free decoding of the data to be transmitted with the respective (sub-)data packets is possible at the receiver end. For example, the time and/or frequency hopping patterns of the first set of time and/or frequency hopping patterns may have the lowest possible autocorrelation functions and/or cross-correlation functions.

Likewise, a second set of time and/or frequency hopping patterns may be available to the participants 106_4-106_5 and/or base station 104 which use the second radio network to transmit data, the time and/or frequency hopping patterns each indicating a (true) subset of the usable frequency and/or time hopping-based occupancy of frequency band 200 (e.g. of second frequency range 208 of frequency band 200) indicated by the second channel access pattern. The time and/or frequency hopping patterns of the second set of time and/or frequency hopping patterns may differ from each other, for example in such a way that they do not overlap or at most overlap to such an extent that an error-free decoding of the data to be transmitted with the respective (sub-)data packets is possible at the receiver end. For example, the time and/or frequency hopping patterns of the second set of time and/or frequency hopping patterns may have the lowest possible autocorrelation functions and/or cross-correlation functions.

Figure 3:
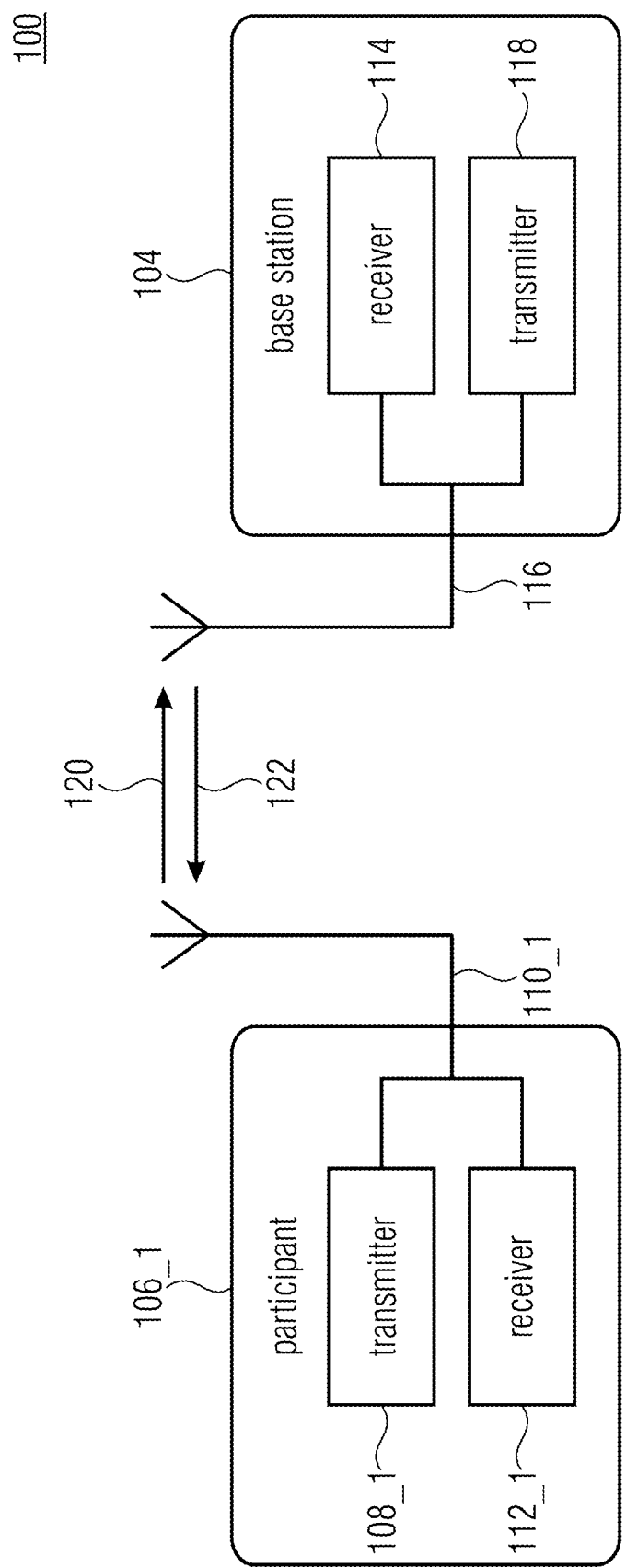
FIG. 3 shows a schematic block diagram of the base station and one of the participants of the communication system shown in FIG. 1, according to an embodiment of the present invention.

FIG. 3 shows a schematic block circuit diagram of the base station 104 and one of the participants 106_1-106_n of the communication system 100 shown in FIG. 1, according to an embodiment of the present invention.

The participant 106_1 may comprise a transmitter (or a transmission module) 108_1 configured to transmit the uplink data transfer 120 to the base station 104. The transmitter 108_1 may be connected to an antenna 110_1 of the participant 106_1. Furthermore, the participant 106_1 may comprise a receiver (or a reception module) 112_1 configured to receive the downlink data transfer 122 from the base station 104. The receiver 112_1 may be connected to the antenna 110_1 or a further antenna of the participant 106_1. The participant 106_1 may also comprise a combined transmitter/receiver (e.g. transmission/reception module; transceiver).

The base station 104 may comprise a receiver (or reception module) 114 configured to receive the uplink data transfer 120 from the participant 106_1. The receiver 114 may be connected to an antenna 116 of the base station 104. Furthermore, the base station 104 may comprise a transmitter (or transmission module) 118 configured to transmit the downlink data transfer 122 to the participant 106_1. The transmitter 118 may be connected to the antenna 116 or a further antenna of the base station 104. The base station 104 may also comprise a combined transmitter/receiver (or transmission/reception module; transceiver). For example, the transceiver module (transceiver) of the base station 104 may be implemented by means of a software defined radio (SDR) transceiver.

In the following, embodiments of a participant 106_1 and a base station 104 are described that can be used, for example, in the communication system 100 described above with reference to FIGS. 1 to 3. Of course, the embodiments of the participant 106_1 and/or the base station 104 described below may also be realized or implemented in other communication systems.

1. Combination of Two Different Classes of Systems in the Same Frequency Band In order to be able to use the advantages of both classes (e.g. asynchronous and synchronous) of systems, a combination of the two classes of systems can be made. However, this is generally not feasible without additional expenditure in terms of hardware costs and/or power consumption, since the systems operate (communicate) in different frequency bands.

There are also systems which communicate in the same frequency band, but this has the disadvantage of mutual interference between the two systems. An example of two systems operating in the same frequency band and also partly being installed in the same hardware is Bluetooth and WLAN. These two systems would ideally complement each other from the point of view of additional expenditure (hardware costs, power consumption) as mentioned in the previous paragraph. However, it is well known from the literature (e.g. in [4]) that there is interference between the two systems during air-borne transmission.

Consequently, there is no practical parallel operation of both systems in order to make use of the advantages of both systems.

This is where embodiments of the present invention come in by combining two systems that use the telegram splitting method [1], [2], [3] (TSMA, TS in short) as the basis for in-channel transmission.

Transmission using TSMA makes it possible to tolerate a certain degree of interference in the channel (typically up to approx. 50% of the sub-packets may be disturbed) without packet loss (and thus also without data loss). If the hopping patterns of the two systems are selected in such a way that less than the maximum permissible interference per transmission is disturbed, both systems can operate in parallel in the same frequency band.

Figure 4:
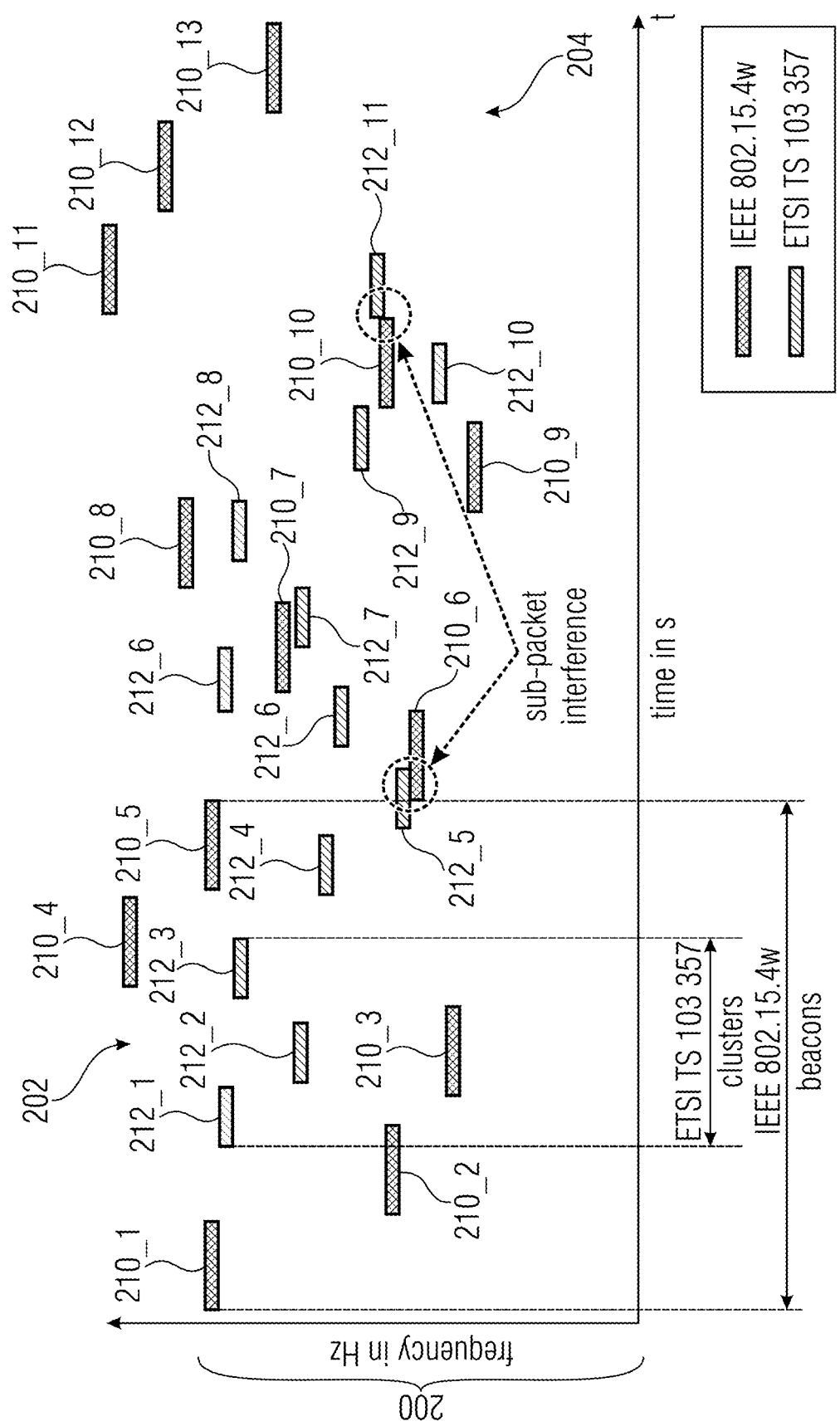
FIG. 4 shows, in a diagram, an occupancy of the communication channel when transmitting sub-data packets in a first communication system according to a first time and/or frequency hopping pattern and transmitting sub-data packets in a second communication system according to a second time and/or frequency hopping pattern, according to an embodiment of the present invention.

An example of such a combination of the two systems is shown in FIG. 4.

In detail, FIG. 4 shows, in a diagram, an occupancy of the communication channel (e.g. frequency band 200) during the transmission of sub-data packets 210_1-210_13 in a first communication system according to a first time and/or frequency hopping pattern 202, and the transmission of sub-data packets 212_1-212_11 in a second communication system according to a second time and/or frequency hopping pattern 204, according to an embodiment of the present invention. Here, the ordinate describes the frequency and the abscissa describes the time.

As exemplified in FIG. 4, the first communication system may use the radio network specified in ETSI TS 103 357 [6], while the second communication system may use the radio network specified in IEEE 802.15.4w [5]. Thus, FIG. 4 shows an exemplary combination of an IEEE 802.15.4w [5] system with an ETSI TS 103 357 [6] system in the same frequency band 200, where there is sporadic interference in the sub-data packets 210_6, 212_4 and 210_10, 212_11.

As can be seen in FIG. 4, although interference may occur between the two systems, it is limited to individual sub-packets 210_6, 212_4 and 210_10, 212_11 (corresponding to a partial interference below the tolerable threshold) so that decoding of the data is possible in both systems.

The bandwidths of the two systems do not have to be identical. For example, the ETSI TS 103 357 [6] system may have 50 channels and the IEEE 802.15.4.w system [5] may have 72 channels. Likewise, the channel bandwidth may be the same or different in both systems. Furthermore, the data rates, data lengths, sub-data packet lengths and modulation may be the same or different.

Parallel reception (and, if used, parallel emission) of the two systems can be achieved, for example via so-called "Software Defined Radio" (SDR in short).

In embodiments, both systems share the frequency band 200. Choosing telegram splitting results in interference to individual sub-data packets 210_6, 212_4 and 210_10, 212_11, but no loss of the original data packets.

1.1 Choice of Hopping Patterns

Traditionally, the hopping patterns of the systems are selected in such a way that they have the best possible inherent immunity to interference and the best possible immunity to classical external interference (e.g. WLAN, Sigfox, LoRa).

The combination of the two systems mutually also results in an external disturbance (disturbance by another system with other system parameters). However, since the hopping patterns of the other system are mutually known, the hopping patterns of the system can be defined in such a way that the mutual interference of the systems is minimized.

This can be achieved, for example, by considering and optimizing not only the respective autocorrelation properties of the hopping patterns of the systems, but also the mutual cross-correlation properties of the hopping patterns.

In embodiments, the hopping patterns may be chosen to be as orthogonal as possible, e.g. such that a guaranteed QoS is achieved (without further external interference).

1.2 Partially Overlapping Hopping Patterns

If the receive bandwidth of the receiver (e.g. the base station 104) is greater than the system bandwidth of the system with the greater bandwidth, it is possible to operate both systems in a partially overlapping mode only. This means that only part of the available bandwidth is used in parallel by both systems.

Figure 5:
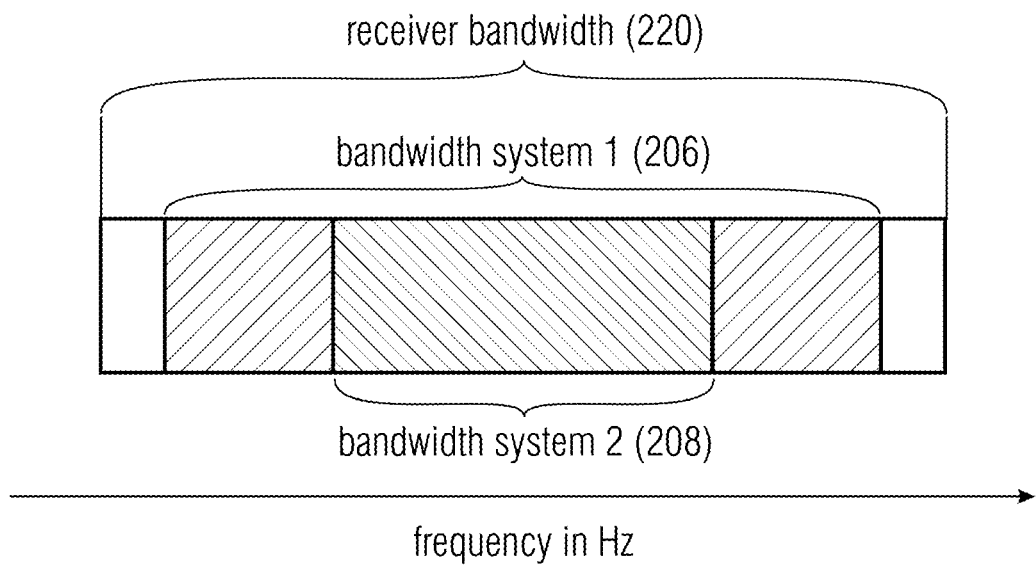
FIG. 5 shows, in a diagram, an example of a system overlay in the same band, wherein the bandwidth of the second system (radio network) is completely included in the bandwidth of the first system (radio network)

FIG. 5 shows a bandwidth of a first system according to section 1, where all of the used bandwidth of the second system is included in the used bandwidth of the first system. According to section 1, both systems are entirely within the receive window of the receiver (e.g. base station 104).

Figure 6:
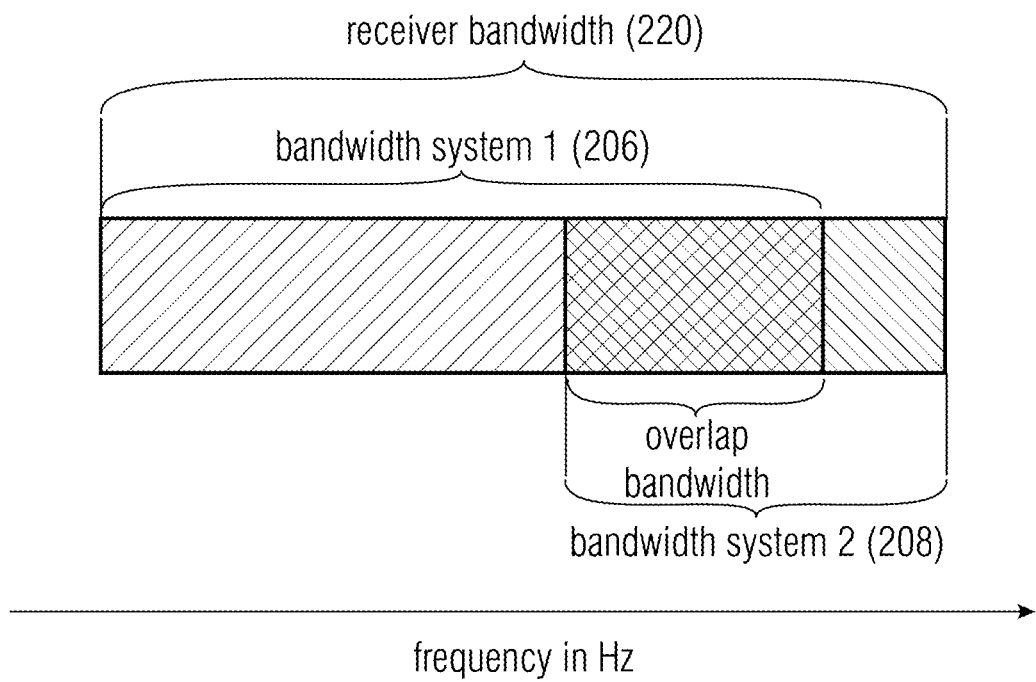
FIG. 6 shows, in a diagram, an example of a system overlay in the same band, wherein both systems (radio networks) only share a partial region of the available frequency band.

In contrast to FIG. 5, in the embodiment shown in FIG. 6, the entire available bandwidth (of either the channel or the receiver) is utilized. In this case, the first system has been shifted to the lower frequency edge and the second system to the upper frequency edge. Shifting the two systems reduces the overlap area and therefore reduces the amount of interference.

In embodiments, the used frequency band 200 may be divided into a range used by both systems and a range used by only one system at a time. However, the receiver (e.g. the base station 104) may receive the entire bandwidth at any given time.

1.3 Dynamic Resource Allocation

The available resources can also be distributed dynamically between synchronous and asynchronous communication, depending on the demand. If, for example, only a few synchronous messages are being transmitted, capacities can be shifted to the asynchronous mode, and vice versa. Especially if a common set of hopping patterns is used, certain hopping patterns can be dynamically reserved for synchronous (coordinated) transmissions to avoid full collisions with asynchronous transmissions. If these reserved hopping patterns are not needed for the synchronous mode (low traffic etc.), the base station 104 can release them for asynchronous transmissions (signaling e.g. in beacon) to increase the capacity there. Analogously, this principle can be applied to frequency carriers, for example, provided that the systems support a corresponding configuration.

In embodiments, resources (e.g. hopping patterns, frequencies, etc.) may be distributed dynamically between synchronous and asynchronous modes (system) based on demand.

In a further step of full integration, CAP (contention access period) and CFP (contention free period) of the synchronous mode can no longer be defined in terms of time but by means of hopping patterns. Asynchronous transfers are then implicitly CAP transfers and use correspondingly released hopping patterns. Conversely, the entire time range can be used simultaneously for scheduling CFP transfers with correspondingly reserved hopping patterns.

2. Same Hardware with Own Software Parts

In practice, the need of having to build a new network infrastructure for new radio standards is usually the biggest hurdle when adopting the same. Therefore, the ability to upgrade a second/new system via software update on an existing system or its infrastructure represents a significant competitive advantage. A similar problem exists on the terminal node side: Since a very large number of terminal nodes are already deployed in a single, typical IoT installation (possibly tens to hundreds of thousands), from the system operator's point of view the upgrade capability via software is also a significant economic advantage with regard to the terminal nodes.

Since the two systems share an (at least partially) common frequency band as described in section 1, it is possible to use a common receiver (or transmitter) on the base station 104 side and to detect or decode the messages of the two systems separately from the IQ data stream.

The same applies to the participants 106_1-106_n (e.g. terminal nodes): Due to the same frequency band for both systems, they can use the same radio chip for both transmissions. This allows upgrading an existing system (alone) by means of a software upgrade to support multiple systems, in particular a synchronous and an asynchronous one as described above.

In embodiments, two different radio systems may operate in parallel on the same hardware (e.g. base station 104) and share their IQ data stream. The same is possible for the nodes (e.g. terminal nodes) of the combined system 100.

In a particular implementation, the two systems may be a synchronous radio system and an asynchronous radio system sharing a frequency band 200.

In a particular implementation, the two systems may be configured as separate software programs that may be executed in parallel/"concurrently" on the same hardware (e.g. base station 104 and/or participants 106_1-106_n (e.g. terminal nodes) of the combined wireless system 100).

3. Dynamic Switching of Participants (and/or Base Station) Between Systems (Radio Networks)

In sections 1 and 2, it has been assumed that although both systems operate in parallel in the same frequency band, both systems are nevertheless independent of each other.

For example, a participant (e.g. node) wanting to communicate in both systems is to also register or log on (or have been registered) or logged on to both systems separately.

However, it is also possible for both systems (or radio networks) to use a common network management (which may be executed, for example, on the base station 104). This allows a participant 106_1 (e.g. node) to attach (or register) only once in one of the two networks (or radio networks) and then to send the data directly via both systems (or radio networks). Used data of the respective other system (or radio network) (e.g. of the one which is not used for attach/registration) can be communicated or exchanged during attach.

In embodiments, both systems (or radio networks) may share a common network management (which may be performed, for example, at the base station 104 or other central control unit of the communication system 100). Thus, each participant 106_1-106_n may transmit data over the more appropriate system (or radio network) as needed (e.g. according to latency requirements).

In embodiments, during and/or after attach of the participant 106_1 to the one network (or wireless network), used data (e.g. system parameters) may be communicated over the other network (or radio network).

4. Asynchronous Attach in Synchronous Network (Radio Network)

Figure 7:
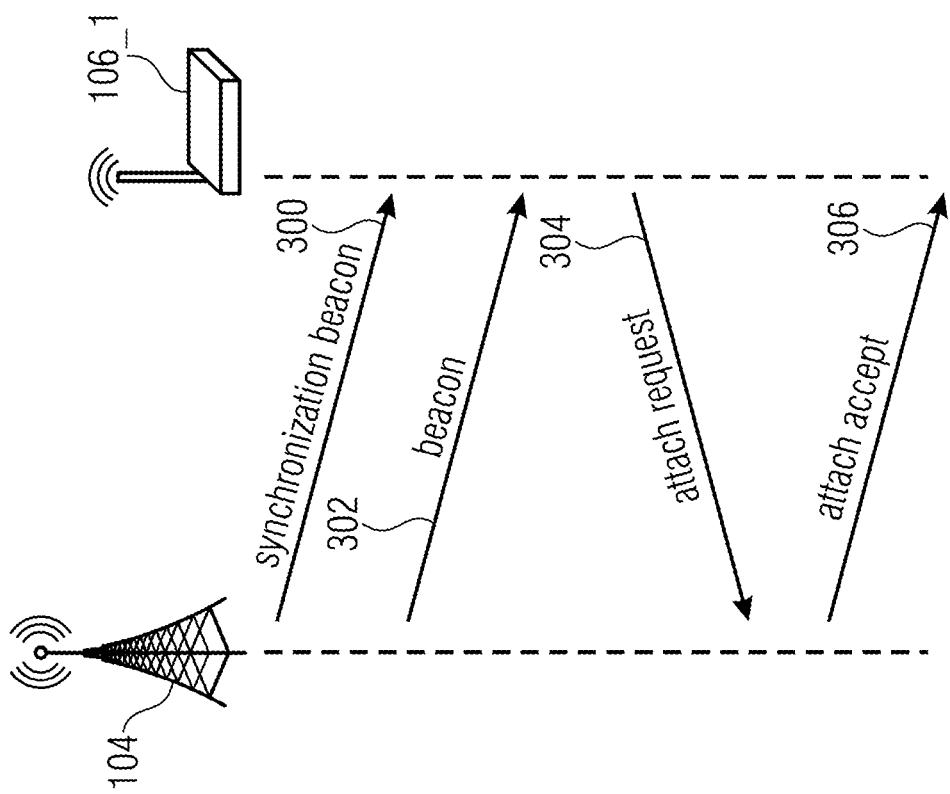
FIG. 7 shows a flowchart of a registration of a participant 106_1 in a synchronous radio network.

If new nodes (e.g. nodes) want to register in a purely synchronous network (radio network), they receive a so-called synchronization message (e.g. synchronization or sync beacon), as shown in FIG. 7. This synchronization message contains the used information to be able to receive the following (and all further) beacons as well.

In detail, FIG. 7 shows a flowchart of an attachment or registration of a participant 106_1 in a synchronous radio network. In a first step 300, a sync beacon is emitted by the base station 104, which can be received by the participant 106_1. In a second step 302, a beacon is emitted by the base station 104, which can be received by the participant 106_1 based on information contained in the sync beacon. In a third step 304, an uplink data transmission including a so-called attach request is transmitted from the participant 106_1 to the base station 104. In a fourth step 306, a downlink data transmission with a so-called attach accept is transmitted from the base station 104 to the participant 106_1.

In other words, FIG. 7 shows a synchronization message being emitted before the beacon. After receiving the beacon, the participant may send an attach request to the base station 104, which may confirm the attach request by an attach accept.

However, this method has two disadvantages, as will be explained below. If the synchronization message is emitted only very infrequently (e.g. only every 30 minutes), it can sometimes take a relatively long time until a new participant 106_1 can register in the network (radio network). This poses a major problem in terms of power consumption in the participant 106_1, since the participant 106_1 is to be activated over the entire duration. Therefore, battery operation is not reasonably possible.

In order to be able to use participants (e.g. node 106_1) with battery operation, the synchronization message would have to be emitted significantly more often, which leads to the second disadvantage of this methodology. If the system (or radio network) is operated in the so-called ISM or SRD bands, only a certain duty cycle is available to each participant 106_1-106_n, as well as to the base station 104. That is, the base station 104 may only emit messages over a certain percentage of the time (e.g. an average of over one hour). If the synchronization message is now sent frequently, hardly any transmission time is available for the beacon and the data packets.

However, in embodiments, due to the possibility that both systems (or radio networks) now operate in parallel in the same band and also use a common network management according to Section 3, an asynchronous attach can be made to the synchronous network. This scheme is shown graphically in FIG. 8.

Figure 8:
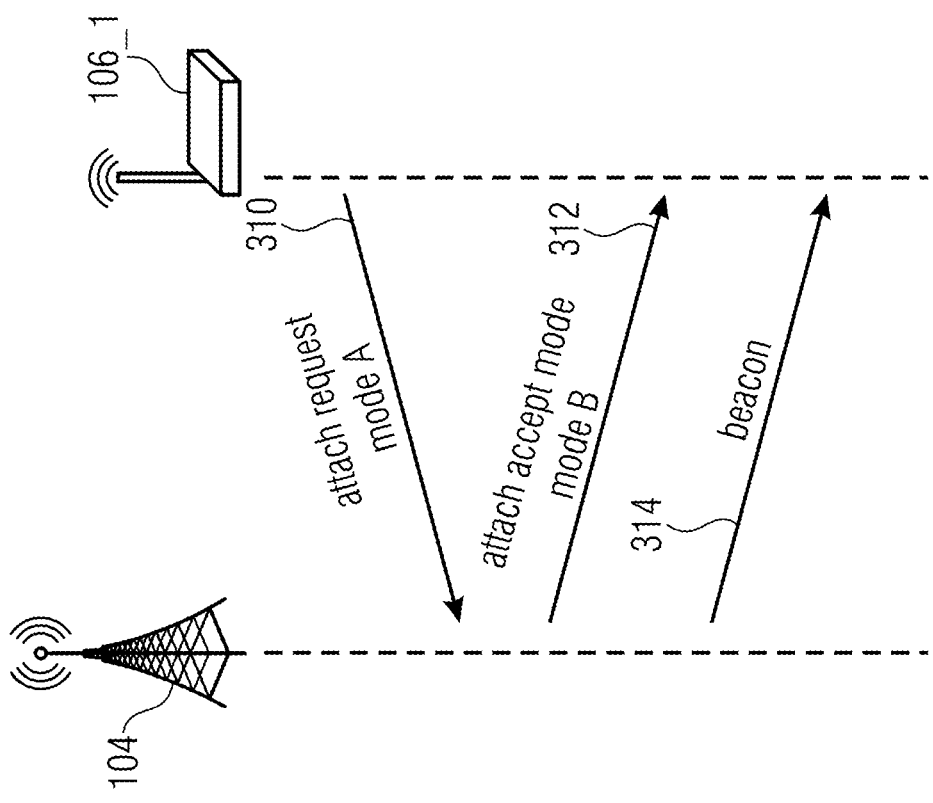
FIG. 8 shows a flowchart of a change of a participant from an asynchronous radio network to a synchronous radio network, according to an embodiment of the present invention.

In detail, FIG. 8 shows a flowchart of a switch of a participant 106_1 from the asynchronous radio network to the synchronous radio network, according to an embodiment of the present invention. In a first step 310, using the asynchronous radio network, an uplink data transmission including an attach uplink request may be transmitted from the participant 106_1 to the base station 104. In a second step 312, using the asynchronous radio network, a downlink data transmission including an attach accept (Ack+Assist) may be transmitted from the base station 104 to the participant 106_1, the downlink data transmission being synchronized in time with the uplink data transmission, as explained in detail above with reference to FIG. 1. The downlink data transmission includes signaling information on a transmission of one or more beacons of the synchronous radio network so that the participant 106_1 can receive such a beacon of the synchronous radio network in a third step 314 based on the signaling information and can thus switch from the asynchronous radio network to the synchronous radio network during operation.

In other words, the participant 106_1 can send an asynchronous Attach Request (e.g. Mode A in [6]) in the uplink. This can be confirmed with an asynchronous Attach Accept (Ack+Assist; e.g. Mode B in [6]). As part of the Attach Accept, the participant 106_1 can be informed of the time of the beacon (and possibly other parameters) in the asynchronous message. In [6], for example, the TSI field can be used for this purpose. Further information on the frequency, hopping pattern, etc. can be available in so-called extension data.

As mentioned above, in embodiments, the downlink data transmission (e.g. with the attach accept) may comprise signaling information on a transmission of at least one beacon of the synchronous radio network. For example, the signaling information may comprise information on a time of transmission of the beacon. Furthermore (or alternatively), the signaling information may comprise information on a frequency or a frequency channel of the transmission of the beacon. Furthermore (or alternatively), the signaling information may comprise information on a time and/or frequency hopping pattern based on which the beacon is transmitted. In other words, the downlink data transmission may be used to transmit further parameters, such as the frequency, hopping pattern, repetition rate, etc., of the beacon.

In embodiments, the participant 106_1 may be configured to transmit an asynchronous uplink data transmission to the base station using the asynchronous radio network and to receive a downlink data transmission from the base station using the first radio network synchronized in time with the transmitted uplink data transmission, wherein the downlink data transmission comprises signaling information, the participant being configured to receive, based on the signaling information, a beacon transmitted by the base station using the synchronous radio network to switch to the synchronous radio network (asynchronous uplink→asynchronous DL→ (synchronous) beacon).

Thus, embodiments allow for rapid registration in a synchronous system.

Similarly, if synchronization is lost, it is also possible to re-establish it by means of an asynchronous request. If, for example, a participant (e.g. node) has not received a beacon for a certain period of time, the participant can send an asynchronous uplink data transmission in order to determine whether the network (e.g. the base station 104) is still accessible, on the one hand, and to obtain synchronization information (or signaling information) in the asynchronous downlink data transmission (downlink response), on the other hand.

In contrast to a new attachment, all the negotiated parameters such as keys or addresses can be retained. This means that a new synchronization (resynchronization) entails less data exchange. If the participant (e.g. node) does not obtain an asynchronous response, it can start a new attach attempt in order to join another available network (radio network) if applicable.

In embodiments, resynchronization may occur upon loss of synchronization via an asynchronous uplink request and a downlink response.

5. Temporary Synchronization of an Asynchronous System

Frequently, there are certain times (so-called high-peak hours) at the base station 104 when many downlink data transmissions (e.g. downlink messages) are to be sent to the participants 106_1-106_n (e.g. in industrial areas during the day or in residential areas in the morning and in the evening), or also occasionally during certain events or major events.

If the transmitted data are individual data for each participant (e.g. node), communication cannot take place via a multicast message.

These high-peak hours pose two problems, especially in an asynchronous system, which make it impossible to supply all the participants 106_1-106_n with the corresponding data. On the one hand, the maximum permitted duty cycle in the typically used unlicensed bands represents a problem, since it is limited and therefore not all the participants can be addressed in the downlink at the respective points in time.

Due to the above-mentioned problem of the limited availability of the radio channel, with a correspondingly high number of participants 106_1-106_n, it can thus still not be guaranteed that each participant can obtain its data in a time interval to be complied with, since individual messages are delayed due to the duty cycle limitation.

With high loads, a synchronous system has the advantage that it can perform a so-called carrier aggregation during the transmission of the data in the downlink. This is possible because exclusive time slots and/or frequency channels have been allocated to the respective participants in advance. As a result, multiple transmissions from the base station 104 to the participants 106_1-106_n can be aggregated in time, resulting in less channel occupancy compared to the asynchronous system (or radio network). Thus, more participants 106_1-106_n can be addressed with the same duty cycle in a synchronous system (or radio network) than in an asynchronous system (or radio network).

Another advantage of the synchronous system (or radio network) when it is busy is the scheduling capabilities. For example, if a message cannot be emitted in the asynchronous system (or radio network) due to duty cycle constraints, the base station 104 has to wait until a new point in time is available for transmission from that participant (e.g. by sending an uplink data transmission (uplink message)). However, this is not known to the base station 104 and thus may exceed the maximum specified time for transmission.

In the synchronous system (or radio networks), on the other hand, the next transmission of the beacon can simply inform the corresponding participant of the pending downlink data transmission (e.g. downlink message). The transmission durations are thus known in the base station 104 and can be used specifically for scheduling in order to guarantee given transmission durations to be complied with.

In addition to these high-peak hours (e.g. times of increased or maximum network load), there are also off-peak hours (e.g. times of low or minimal network load) during which relatively few messages are sent. This case is best suited for the asynchronous network (wireless network) since complexity is only entailed at the base station 104. The participants 106_1-106_n can thus transmit and receive their data in the most energy-efficient manner possible since they simply access the channel as needed and do not need to synchronize and listen to a beacon at certain intervals.

If the off-peak hours and the high-peak hours are known in advance and both systems (or radio networks) operated in parallel use a common network management, the network (or communication system 100) can be controlled in such a way that only the synchronous system (or radio network) is used during the high-peak hours and only the asynchronous system (or radio network) is used during the off-peak hours. In this way, the advantages of both systems (radio networks) can be used optimally.

If the off-peak hours and the high-peak hours are not known in advance, it is also possible to coordinate all participants 106_1-106_n from the asynchronous system (or radio network) to the synchronous system (or radio network) in dynamic operation. However, due to the fact that the participants 106_1-106_n in the asynchronous network (radio network) can only be addressed after special events, this can take a certain amount of time until all the participants 106_1-106_n are logged into the synchronous network (radio network).

However, switching from the synchronous network (radio network) to the asynchronous network (radio network) is possible at any time by means of a point-to-multipoint data transmission (e.g. multicast message) without any problems and without much time expenditure.

In embodiments, switching from an asynchronous system (or radio network) to a synchronous system (or radio network) may occur at high duty cycle times.

In embodiments, a dynamic or planned fallback to the asynchronous system (or radio network), e.g. by switching off the beacon, may occur during periods of lower downlink traffic or latency requirements, etc.

The problems of the asynchronous network during high-peak hours described above relate only to the downlink from the base station 104 to the participants 106_1-106_n (e.g. nodes).

It is therefore also possible to continue to allow asynchronous uplink data transmissions (e.g. uplink messages) during high-peak hours and to transmit only the downlink by means of the synchronous system (or radio network). This has the advantage that only participants who expect a downlink data transmission (or can receive it, e.g. bidirectional participants (e.g. nodes)), have to switch to the synchronous network (radio network). This also allows the continuous operation of participants (e.g. nodes) that only support asynchronous transmissions.

Furthermore, it is possible to supply only a part (e.g. the majority) of the participants 106_1-106_n with data in the downlink by means of the synchronous system (radio network). Energy-saving participants can continue to be supplied via the asynchronous network (radio network).

In embodiments, at high duty cycle times, the downlink of the system (or communication system 100) may be transmitted by the synchronous system (or radio network). The uplink may further be transmitted by the asynchronous radio network (e.g. using asynchronous messages).

In embodiments, individual participants which need to be operated in an energy-saving manner can continue to be supplied with data via the asynchronous radio network or, in the case of time-uncritical applications, can be moved to off-peak hours.

In embodiments, for example, similarly to section 4, the uplink may continue to be transmitted asynchronously from the participants 106_1-106_n to the base station 104 and the downlink may be transmitted synchronously from the base station 104 to the participants 106_1-106_n at times, such that a mixed form of synchronous and asynchronous transmission occurs in the downlink.

Thus, the participants 106_1-106_n can continue to define times (e.g. after an uplink data transmission (e.g. uplink message)) in the asynchronous network (radio network) at which a participant-specific downlink data transmission (e.g. downlink message) is possible. Further, all the participants configured by the base station 104 may listen to the channel at predetermined times (e.g. every 30 seconds or every 15 minutes) to determine whether a message (e.g. a beacon or a point-to-multipoint or multicast data transmission) is present there.

Thus, the base station 104 has the ability to provide a downlink message to the participant (e.g. node) either individually (latency unknown to the base station) or as part of the group message (latency known to the base station). In the group message (e.g. beacon), it may be possible to signal for which nodes individual data are pending after the group message.

The group message can also be used as point-to-multipoint data transmission (e.g. multicast message) (e.g. for firmware updates).

In embodiments, the uplink of the combined system (e.g. the communication system 100) may be performed to be purely asynchronous. In the downlink, the participants 106_1-106_n (e.g. nodes) may be addressed both asynchronously and synchronously using the regular group message (e.g. beacon).

If the dual downlink approach is used, the base station 104 can emit the group message (e.g. beacon) at defined regular (or known) intervals, even if it does not want to address any participants with it. Thus, emission is made with no useful content, since none of the participants has to receive the message.

If the intervals between group messages (e.g. beacons) are periodic (or known in advance for several emissions), it is not necessary to actually emit each pending group message ("virtual beacon").

Thus, all participants listen to the channel at the agreed time (and if applicable with the defined hopping pattern). If no information is received there, it is known that no message was emitted. If a message was received, they can decode the data and react accordingly.

This methodology is used to ensure that the base station 104 used less duty cycle in the downlink (duty cycle limitation in the ISM and SRD bands), since the group message (e.g. beacon) is transmitted in the downlink only when needed.

In embodiments, the group message (e.g. beacon) may be emitted in the downlink only when needed.

6. Key Exchange

In a synchronous network (radio network), a common key is to be able to encrypt transmissions for multiple participants 106_1-106_n. It is also desirable to also encrypt the transmission of the beacon so that no information on resource allocation or scheduling are disclosed to third parties. This information could be used, for example, to specifically interfere in the network or to obtain meta information on the activity of participants 106_1-106_n.

Encryption of the beacon (i.e., the scheduling information), however, means that new participants obtain the common key before they are able to send coordinated messages.

In a pure synchronous system, this problem can be solved by using a special synchronization beacon that is not encrypted or is encrypted with a predefined key.

In any case, this means that it is not possible to secure the synchronization information network-specifically against third parties. This problem can be bypassed by an attach using an asynchronous mode. For example, an individual key can be generated for the new participant (e.g. node) on the basis of a mutually known secret key (preshared secret). The thus obtained secure channel to the participant (e.g. node) can be used to transmit the common key of the network or of groups within the network.

In embodiments, a distribution of common keys may be performed via individually secured connections to the participants (e.g. nodes).

Since the common key is known to all the participants, there is an increased risk that it will be compromised and used, for example, by third parties to specifically interfere in the network (or radio network). The individually secured communication channels to the individual participants (e.g. nodes) also allow the network to be maintained in this case and restored with a new common key.

In embodiments, common keys can be updated via individually secured connections to the nodes in cases common keys are compromised.

Further Embodiments

FIG. 9 shows a flowchart of a method 320 for operating a participant of a communication system, according to an embodiment of the present invention. The method 320 comprises a step 322 of transmitting data depending on an operating mode of the participant using a first radio network or a second radio network in a [e.g. in the same] frequency band [e.g. which is used by a plurality of communication systems; e.g. the ISM band], wherein in the first radio network data are transmitted according to a first time and/or frequency hopping pattern in a first frequency range of the frequency band, wherein in the second radio network data are transmitted according to a second time and/or frequency hopping pattern in a second frequency range of the frequency band, wherein the first time and/or frequency hopping pattern and the second time and/or frequency hopping pattern are different, wherein the first frequency range and the second frequency range overlap at least partially.

FIG. 10 shows a flowchart of a method 330 for operating a base station of a communication system, according to an embodiment of the present invention. The method 330 comprises a step 332 of transmitting data using a first radio network and a second radio network in a [e.g. in the same] frequency band [e.g. which is used by a plurality of communication systems; e.g. the ISM band], wherein in the first radio network data are transmitted according to a first time and/or frequency hopping pattern in a first frequency range of the frequency band, wherein in the second radio network data are transmitted according to a second time and/or frequency hopping pattern in a second frequency range of the frequency band, wherein the first time and/or frequency hopping pattern and the second time and/or frequency hopping pattern are different, wherein the first frequency range and the second frequency range overlap at least partially.

FIG. 11 illustrates a flowchart of a method 340 for operating a communication system, according to an embodiment of the present invention. The method 340 comprises a step 342 of transmitting data between participants and/or a base station of the communication system using a first radio network and a second radio network in a frequency band [e.g. which is used by a plurality of communication systems; e.g. the ISM band], wherein in the first radio network data are transmitted according to a first time and/or frequency hopping pattern in a first frequency range of the frequency band, wherein in the second radio network data are transmitted according to a second time and/or frequency hopping pattern in a second frequency range of the frequency band, wherein the first time and/or frequency hopping pattern and the second time and/or frequency hopping pattern are different, wherein the first frequency range and the second frequency range overlap at least partially.

FIG. 12 shows a flowchart of a method 350 for operating two communication systems in a frequency band used by a plurality of communication systems for wireless communication, according to an embodiment of the present invention. The method 350 comprises a step 352 of transmitting data in the first communication system using a first radio network in the frequency band [e.g. in a first frequency range of the frequency band]. The method 350 further comprises a step 354 of transmitting data in the second communication system using a second radio network in the frequency band [e.g. in a first frequency range of the frequency band], wherein in the first radio network, the frequency band is accessed based on a first time and/or frequency hopping pattern [e.g. channel access pattern], wherein in the second radio network, the frequency band is accessed based on a second time and/or frequency hopping pattern [e.g. channel access pattern], wherein the first radio network and the second radio network are different, wherein the first time and/or frequency hopping pattern and the second time and/or frequency hopping pattern are different, wherein the first time and/or frequency hopping pattern and the second time and/or frequency hopping pattern are selected such that a total failure of data transmission due to mutual interference is avoided.

Embodiments of the present invention are applied in systems for radio transmission of data from terminal devices to a base station or from one or more base stations to terminal devices. For example, a system may be a personal area network (PAN) or a low power wide area network (LPWAN), where the terminal devices may be, for example, battery-powered sensors (sensor nodes).

Embodiments are aimed at applications in which a message (data packet) is transmitted in several partial data packets by means of the so-called telegram splitting multiple access (TSMA) method.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example.

The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

For example, the apparatuses described herein may be implemented using a hardware device, or using a computer, or using a combination of a hardware device and a computer.

The apparatuses described herein, or any components of the apparatuses described herein, may at least be partially implement in hardware and/or software (computer program).

For example, the methods described herein may be implemented using a hardware device, or using a computer, or using a combination of a hardware device and a computer.

The methods described herein, or any components of the methods described herein, may at least be partially implement by performed and/or software (computer program).

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

BIBLIOGRAPHY

[1] EN 10 2011 082 098 B4
[2] G. Kilian, H. Petkov, R. Psiuk, H. Lieske, F. Beer, J. Robert, and A. Neuberger, "Improved coverage for low-power telemetry systems using telegram splitting," in Proceedings of 2013 European Conference on Smart Objects, Systems and Technologies (SmartSysTech), 2013.
[3] G. Kilian, M. Breiling, H. H. Petkov, H. Lieske, F. Beer, J. Robert, and A. Neuberger, "Increasing Transmission Reliability for Telemetry Systems Using Telegram Splitting," IEEE Transactions on Communications, vol. 63, no. 3, pp. 949-961, March 2015.
[4] https://www.pcwelt.de/ratgeber/Konflikte-zwischen-WLAN-und-Bluetooth-242893.html
[5] IEEE 802.15.4w Specification
[6] ETSI TS 103 357 Specification

The invention claimed is:

1. A participant of a communication system, the participant comprising:
a transceiver,
wherein the transceiver is configured to transmit data using a first radio network and a second radio network in a frequency band,
wherein the transceiver is configured to transmit data in the first radio network according to a first time/frequency hopping pattern in a first frequency range of the frequency band,
wherein the transceiver is configured to transmit data in the second radio network according to a second time/frequency hopping pattern in a second frequency range of the frequency band,
wherein the first time/frequency hopping pattern and the second time/frequency hopping pattern are different,
wherein the first frequency range and the second frequency range overlap at least partially,
wherein the first radio network is an asynchronous radio network in which participants of the communication system are able to transmit data to a base station at any points in time,
wherein the second radio network is a synchronous radio network in which exclusive resources to transmit the data are allocated to the participants,
wherein the transceiver is configured to transmit an asynchronous uplink data transmission to a base station of the communication system using the first radio network and to receive a downlink data transmission from the base station synchronized in time with the transmitted uplink data transmission using the first radio network, the downlink data transmission comprising signaling information,
wherein the transceiver is configured to receive, based on the signaling information, at least one beacon transmitted by the base station using the second radio network to switch to the second radio network,
wherein the signaling information comprise information on a point in time and/or a frequency channel of the at least one beacon.

2. The participant according to claim 1,
wherein the transceiver is configured to switch during operation between a first operating mode in which the transceiver transmits data using the first radio network, and a second operating mode in which the transceiver transmits data using the second radio network.

3. The participant according to claim 1,
wherein the transceiver is configured to acquire information used for communication in the second radio network, using the first radio network, and/or
wherein the transceiver is configured to acquire information used for communication in the first radio network, using the second radio network.

4. The participant according to claim 1,
wherein the transceiver is configured to transmit data to a base station or an other transceiver of the communication system at a first point in time using the first radio network and to transmit data to the base station or the other transceiver at a second point in time using the second radio network.

5. The participant according to claim 1,
wherein the transceiver is configured to transmit data using the first radio network and to receive data using the second radio network,
or wherein the transceiver is configured to transmit data using the second radio network and to receive data using the first radio network.

6. The participant according to claim 1,
wherein the signaling information comprise information on at least one beacon transmission parameter, the at least one beacon transmission parameter being at least one of:
a time/frequency hopping pattern of the at least one beacon,
a calculation rule for the points in time and/or frequency channels and/or time/frequency hopping patterns of the transmission of the at least one beacon,
a time interval between successive transmissions of the beacon,
a calculation rule for the time intervals between successive transmissions of the beacon,
a cryptographic key for the transmission of the beacon, and
a calculation rule for generating a cryptographic key for the transmission of the at least one beacon.

7. The participant according to claim 1,
wherein the transceiver is configured to transmit a new uplink data transmission to the base station using the first radio network upon non-reception of at least one beacon transmitted using the second radio system, and to receive a further downlink data transmission from the base station synchronized in time with the transmitted uplink data transmission using the first radio network, the further downlink data transmission comprising signaling information,
wherein the transceiver is configured to receive again, based on the signaling information, at least one beacon transmitted by the base station using the second radio network to switch again to the second radio network.

8. The participant according to claim 1,
wherein the data comprise a data packet, the transceiver being configured to transmit the data packet divided into a plurality of sub-data packets, the plurality of sub-data packets each being shorter than the data packet, the transceiver being configured to transmit the plurality of sub-data packets according to the respective time/frequency hopping pattern.

9. A base station 9 comprising:
a transceiver,
wherein the transceiver is configured to transmit data using a first radio network and a second radio network in a frequency band,
wherein the transceiver is configured to transmit data in the first radio network according to a first time/frequency hopping pattern in a first frequency range of the frequency band,
wherein the transceiver is configured to transmit data in the second radio network according to a second time/frequency hopping pattern in a second frequency range of the frequency band,
wherein the first time/frequency hopping pattern and the second time/frequency hopping pattern are different,
wherein the first frequency range and the second frequency range overlap at least partially,
wherein the first radio network is an asynchronous radio network in which participants of the communication system are able to transmit data to the base station at any points in time,
wherein the second radio network is a synchronous radio network in which the base station allocates exclusive resources to transmit the data to the participants of the communication system,
wherein the transceiver is configured to receive an asynchronous uplink data transmission from a participant of the communication system using the first radio network and to transmit a downlink data transmission to the participant synchronized in time with the received uplink data transmission using the first radio network, the downlink data transmission comprising signaling information on a transmission of at least one beacon,
wherein the transceiver is configured to transmit the at least one beacon for synchronizing participants of the second radio network using the second radio network,
wherein the signaling information comprise information on a point in time and/or a frequency channel of the at least one beacon.

10. The base station according to claim 9,
wherein the transceiver is configured to transmit the at least one beacon only when required.

11. The base station according to claim 9,
wherein the signaling information comprise information on at least one beacon transmission parameter, the at least one beacon transmission parameter being at least one of:
a time/frequency hopping pattern of the at least one beacon,
a calculation rule for the points in time and/or frequency channels and/or time/frequency hopping patterns of the transmission of the at least one beacon,
a time interval between successive transmissions of the beacon,
a calculation rule for the time intervals between successive transmissions of the beacon,
a cryptographic key for the transmission of the beacon, and
a calculation rule for generating a cryptographic key for the transmission of the at least one beacon.

12. The base station according to claim 9,
wherein the transceiver is configured to emit a plurality of beacons using the second radio network at certain intervals,
wherein the signaling information comprise information on the transmission of at least one next beacon of the plurality of beacons.

13. The base station according to claim 9,
wherein the transceiver is configured to renew and/or modify at least one cryptographic key used to encrypt data transmitted using the second radio network, using a cryptographically encrypted transmission in the first radio network.

14. The base station according to claim 9,
wherein the transceiver is configured to simultaneously transmit data using the first radio network and the second radio network.

15. The base station according to claim 9,
wherein the transceiver is configured to transmit signaling information signaling a radio network to be used from the first radio network and the second radio network, to at least one participant of the communication system.

16. The base station according to claim 9,
wherein the transceiver is configured to select one of the radio networks for transmitting data to be transmitted from the first radio network and the second radio network in dependence on transmission requirements of the data to be transmitted and/or in dependence on operating parameters of a participant of the communication system which is to receive the data.

17. The base station according to claim 9,
wherein the transceiver is configured to transmit signaling information signaling an availability of the first and/or second radio network, to at least one participant of the communication system using the first and/or second radio network.

18. The base station according to claim 9,
wherein the transceiver is configured to transmit information used for communication in the second radio network to at least one participant of the communication system using the first radio network, and/or
wherein the transceiver is configured to transmit information used for communication in the first radio network to at least one participant of the communication system using the second radio network.

19. The base station according to claim 9,
wherein the transceiver is configured to temporarily cease operation of the first radio network or the second radio network.

20. A method of operating a communication system, comprising:
transmitting data between participants and a base station of the communication system using a first radio network and a second radio network in a frequency band,
wherein, in the first radio network, data are transmitted according to a first time/frequency hopping pattern in a first frequency range of the frequency band,
wherein, in the second radio network, data are transmitted according to a second time/frequency hopping pattern in a second frequency range of the frequency band,
wherein the first time/frequency hopping pattern and the second time/frequency hopping pattern are different,
wherein the first frequency range and the second frequency range overlap at least partially,
wherein the first radio network is an asynchronous radio network in which participants of the communication system are able to transmit data to the base station at any points in time,
wherein the second radio network is a synchronous radio network in which exclusive resources to transmit the data are allocated to the participants,
transmitting an asynchronous uplink data transmission from a participant of the communication system to the base station using the first radio network,
transmitting a downlink data transmission from the base station to the participant synchronized in time with the received uplink data transmission using the first radio network, the downlink data transmission comprising signaling information on a transmission of at least one beacon,
transmitting a beacon from the base station to the participants for synchronizing the participants of the second radio network, using the second radio network,
wherein the signaling information comprise information on a point in time and/or a frequency channel of the at least one beacon.

\* \* \* \* \*

UNITED STATES PATENT AND TRADEMARK OFFICE
CERTIFICATE OF CORRECTION

PATENT NO. : 12,225,520 B2
APPLICATION NO. : 17/492073
DATED : February 11, 2025
INVENTOR(S) : Gerd Kilian et al.

It is certified that error appears in the above-identified patent and that said Letters Patent is hereby corrected as shown below:

In the Claims

In Claim 9, Column 33 Line 50, immediately following "station", please delete "9"

Signed and Sealed this
Thirteenth Day of May, 2025

Coke Morgan Stewart
*Acting Director of the United States Patent and Trademark Office*